US008099573B2

(12) United States Patent
Camble et al.

(10) Patent No.: US 8,099,573 B2
(45) Date of Patent: Jan. 17, 2012

(54) DATA PROCESSING APPARATUS AND METHOD OF PROCESSING DATA

(75) Inventors: Peter Thomas Camble, Bristol (GB); Gregory Trezise, Wells (GB); Mark David Lillibridge, Mountain View, CA (US); Kave Eshghi, Los Altos, CA (US); Vinay Deolalikar, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 606 days.

(21) Appl. No.: 12/256,329

(22) Filed: Oct. 22, 2008

(65) Prior Publication Data
US 2009/0113167 A1 Apr. 30, 2009

Related U.S. Application Data

(60) Provisional application No. 61/000,425, filed on Oct. 25, 2007.

(51) Int. Cl.
G06F 12/00 (2006.01)
G06F 13/00 (2006.01)
G06F 13/28 (2006.01)

(52) U.S. Cl. .................. 711/162; 711/154; 711/170
(58) Field of Classification Search .................. 711/154, 711/161–162, 170
See application file for complete search history.

(56) References Cited

U.S. PATENT DOCUMENTS

| 5,638,509 | A | 6/1997 | Dunphy et al. |
| 5,990,810 | A | 11/1999 | Williams |
| 6,513,050 | B1 | 1/2003 | Williams |
| 6,839,680 | B1 | 1/2005 | Liu |
| 6,938,005 | B2 | 8/2005 | Iverson et al. |
| 6,961,009 | B2 | 11/2005 | McCanne |
| 7,082,548 | B2 | 7/2006 | Nakano |
| 7,269,689 | B2 | 9/2007 | Eshghi |
| 2001/0010070 | A1 | 7/2001 | Crockett et al. |
| 2001/0011266 | A1 | 8/2001 | Baba |
| 2002/0156912 | A1* | 10/2002 | Hurst et al. ............... 709/236 |
| 2002/0169934 | A1* | 11/2002 | Krapp et al. ............... 711/159 |
| 2003/0101449 | A1 | 5/2003 | Bentolila |
| 2003/0140051 | A1 | 7/2003 | Fujiwara |

(Continued)

FOREIGN PATENT DOCUMENTS
WO 2006030326 A1 3/2006
(Continued)

OTHER PUBLICATIONS

Fenstermacher et al.; "Mining Client-Side Activity for Personalization" Department of Management Information Systems, Eller College of Business and Public Administration, University of Arizona, Jun. 2002 (8 pages).

(Continued)

Primary Examiner — Jared Rutz
Assistant Examiner — Ryan Bertram

(57) ABSTRACT

Data processing apparatus comprising: a chunk store containing specimen data chunks, a manifest store containing at least one manifest that represents at least a part of a data set and that comprises at least one reference to at least one of said specimen data chunks, a sparse chunk index containing information on only those specimen data chunks having a predetermined characteristic, the processing apparatus being operable to process input data into input data chunks and to use the sparse chunk index to identify at least one of said at least one manifest that includes at least one reference to one of said specimen data chunks that corresponds to one of said input data chunks having the predetermined characteristic.

18 Claims, 9 Drawing Sheets

U.S. PATENT DOCUMENTS

| | | | |
|---|---|---|---|
| 2004/0162953 A1 | 8/2004 | Yoshida | |
| 2005/0091234 A1 | 4/2005 | Hsu | |
| 2006/0059171 A1* | 3/2006 | Borthakur et al. | 707/100 |
| 2006/0059173 A1 | 3/2006 | Hirsch | |
| 2006/0059207 A1 | 3/2006 | Hirsch | |
| 2006/0293859 A1 | 12/2006 | Pipke | |
| 2007/0220197 A1 | 9/2007 | Lasser | |
| 2007/0250519 A1 | 10/2007 | Fineberg | |
| 2007/0250670 A1 | 10/2007 | Fineberg | |
| 2008/0126176 A1 | 5/2008 | Iguchi | |
| 2009/0019246 A1* | 1/2009 | Murase | 711/162 |
| 2009/0112945 A1 | 4/2009 | Camble | |
| 2009/0112946 A1 | 4/2009 | Jones | |
| 2010/0198792 A1 | 8/2010 | Camble | |
| 2010/0198832 A1 | 8/2010 | Jones | |
| 2010/0205163 A1 | 8/2010 | Eshghi | |
| 2010/0235372 A1 | 9/2010 | Camble | |
| 2010/0235485 A1 | 9/2010 | Lillibridge | |
| 2010/0246709 A1 | 9/2010 | Lillibridge | |
| 2010/0280997 A1 | 11/2010 | Lillibridge | |
| 2010/0281077 A1 | 11/2010 | Lillibridge | |
| 2011/0040763 A1 | 2/2011 | Lillibridge | |

FOREIGN PATENT DOCUMENTS

| | | |
|---|---|---|
| WO | 2006094365 A1 | 9/2006 |
| WO | 2006094366 A1 | 9/2006 |
| WO | 2006094367 A1 | 9/2006 |
| WO | WO2006094365 | 9/2006 |
| WO | WO2006094366 | 9/2006 |
| WO | WO2006094367 | 9/2006 |
| WO | 2007127248 A2 | 11/2007 |
| WO | 2009054828 A1 | 4/2009 |
| WO | 2009131585 A1 | 10/2009 |

OTHER PUBLICATIONS

Baoyao, Zhou; ""Intelligent Web Usage Mining"" Nanyang Technological University, Division of Information Systems, School of Computer Engineering, 2004 (94 pages).

Baynote Inc.: The Collective Intelligence Platform, Online, http://www.baynote.com/technology/platform/ 2010 (1 page).

Hottolink Inc.; "Recognize" Online, http://www.hottolink.co.jp/english/reconize.html, 2009 (2 pages).

Andrejko et al.: User Characteristics Acquisition from Logs with Semantics, Slovak University of Technology in Bratislava, 2007 (8 pages).

Hongjun Lu et al: Extending a Web Browser with Client-Side Mining, Hong Kong University of Science and Technology Department of Computer Science, Clear Water Bay, Kowloon, Hong Kong, China, 2003 (12 pages).

Shankar et al.; ""Personalized Web Search Based on Client Side Ontology"", CS 498: B.Tech Project,10. IIT Kanpur, India 2010 (9 pages).

Sendhikumar et al.; "Personalized ontology for web search personalization" Anna University, Chennai, India , 2008 (7 pages).

Shahabi et al.; "Yoda an Accurate and Scalable Web based Recommendation System?" University of SouthernCalifornia, Los Angeles, Sep. 2001 (14 pages).

Claypool et al.; "Implicit Interest Indicators", Worcester Polytechnic Institute, Worcester, Computer Science Department Worcester Polytechnic Institute Worcester, MA 01609, USA., 2001 (8 pages).

Shahabi et al.; A Framework for Efficient and Anonymous Web Usage Mining Based on Client-Side Tracking, University of Southern California, Los Angeles, 2002 (48 pages).

Clattertrap; Online http://www.clattertrap.com; Jul. 20, 2010 (1 page).

HSNW: SRI defense technology spawns civilian application: published Jun. 29, 2010 (2 pages).

Anthony Ha: Facebook investor backs Chattertrap, a personal assistant for content, Jun. 28, 2010 (6 pages).

U.S. Appl. No. 11/411,467, Non-Final Rejection dated Jan. 27, 2009 (pp. 1-9 and attachments).

U.S. Appl. No. 11/411,467, Final Rejection dated Aug. 11, 2009 (pp. 1-11 and attachment).

U.S. Appl. No. 11/411,467, Examiner's Answer dated May 11, 2010 (pp. 1-11 and attachment).

Muthitacharoen Athicha, et al., "A Low-Bandwidth Network File System," Proceedings of the 18th ACM Symposium on Operating Systems Principles (SOSP '01), Oct. 2001.

L. L. You and C. Karamanolis. Evaluation of Efficient Archival Storage Techniques. In Proceedings of the 21st IEEE / 12th NASA Goddard Conference on Mass Storage Systems and Technologies, pp. 227-232, College Park, Maryland, Apr. 2004.

You L. L. et al., "Deep Store an Archival Storage System Architecture" Data Engineering, 2005. ICDE 2005. Proceedings. 21st. intl Conf on Tokyo, Japan, Apr. 5-8, 2005, pp. 12.

Eshghi et al., "Jumbo Store: Providing Efficient Incremental Upload and Versioning for a Utility Rendering Service," 2007 (16 pages).

U.S. Appl. No. 10/870,783, Non-Final Rejection dated Dec. 15, 2006, pp. 1-4 and attachments.

U.S. Appl. No. 10/870,783, Notice of Allowance dated Jun. 13, 2007 (7 pages).

Brin, Sergey, et al., "Copy Detection Mechanisms for Digital Documents", Department of Computer Science, Stanford University, Oct. 31, 1994, p. 1-12.

Manber, Udi, "Finding Similar Files in a Large File System," Department of Computer Science, University of Arizona, TR 93-33, Oct. 1993, (11 pages).

Rabin, M.O., "Fingerprinting by Random Polynomials," Technical Report, Center for Research in Computing Technology, Harvard University, 1981, Report TR-15-81 (14 pages).

U.S. Appl. No. 12/257,659, Non-Final Rejection dated Apr. 28, 2011, pp. 1-23 and attachment.

* cited by examiner

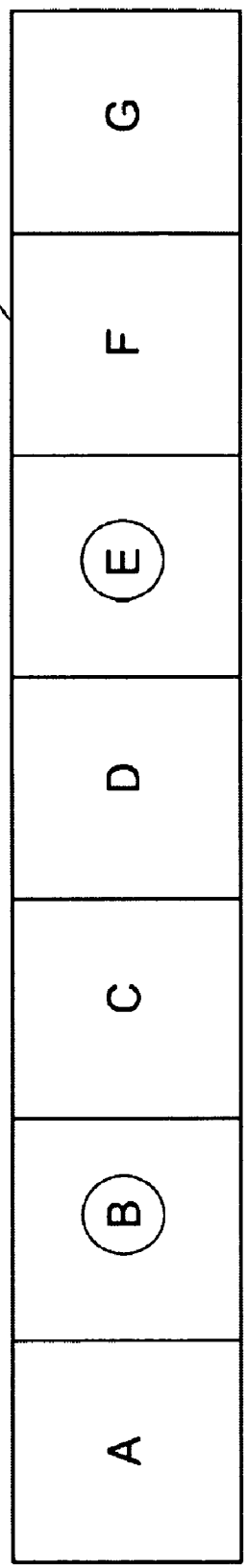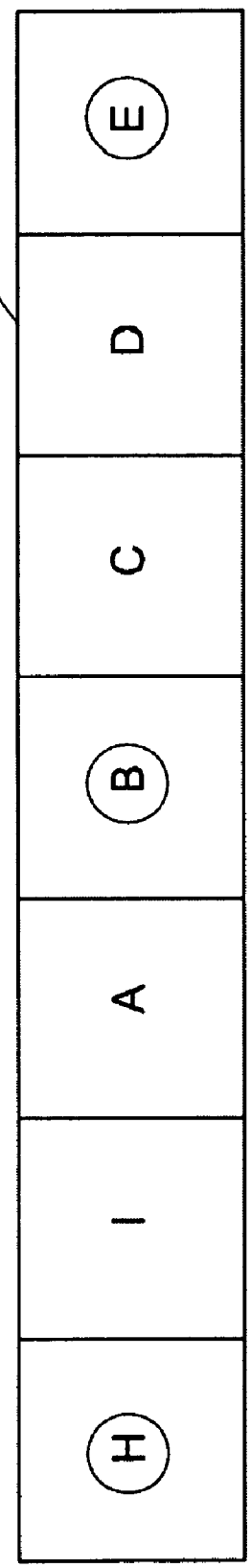
FIG 5

FIG. 6
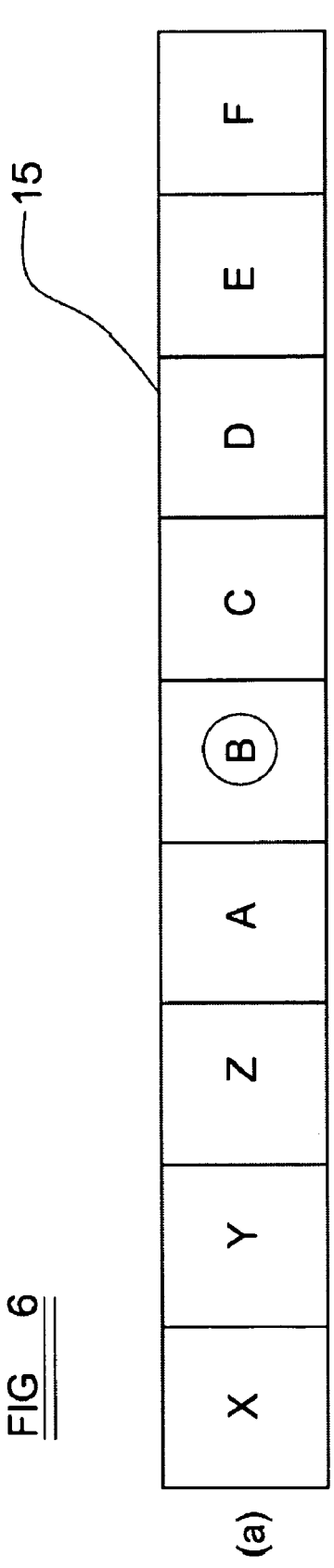
(a)
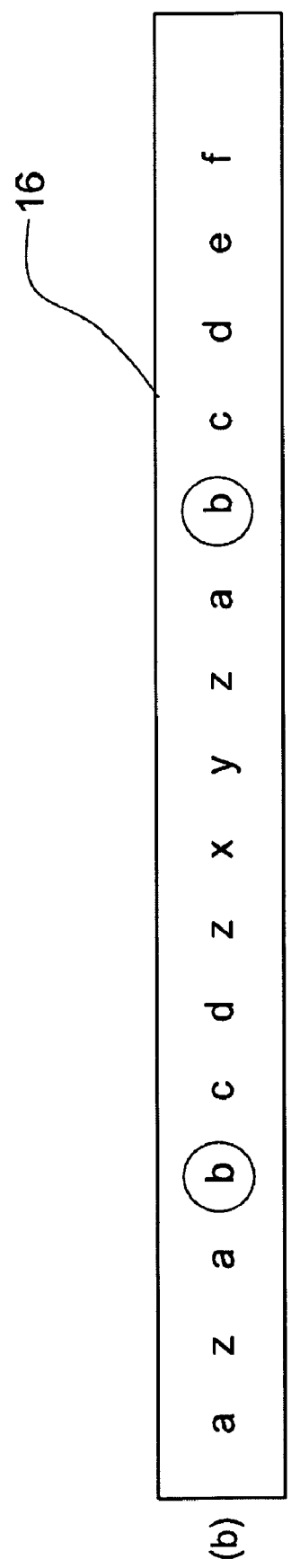
(b)

FIG. 7
(a) 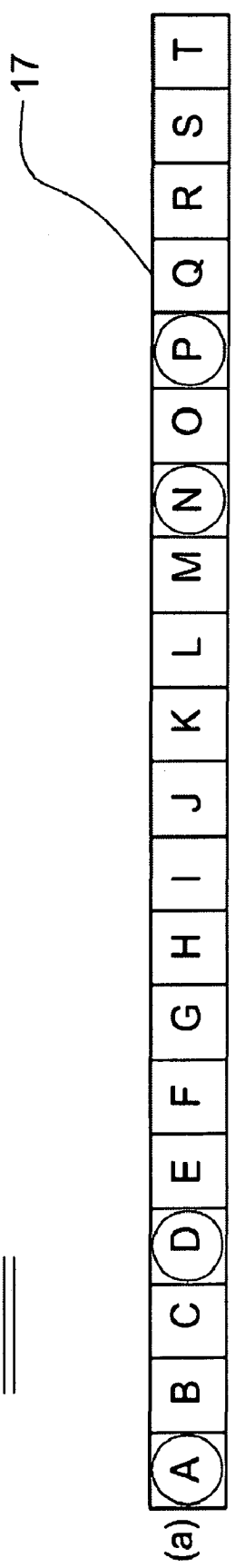
(b) 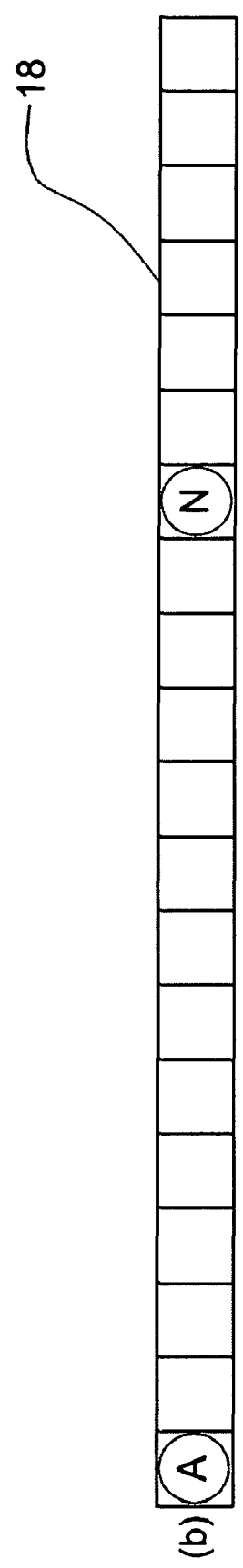

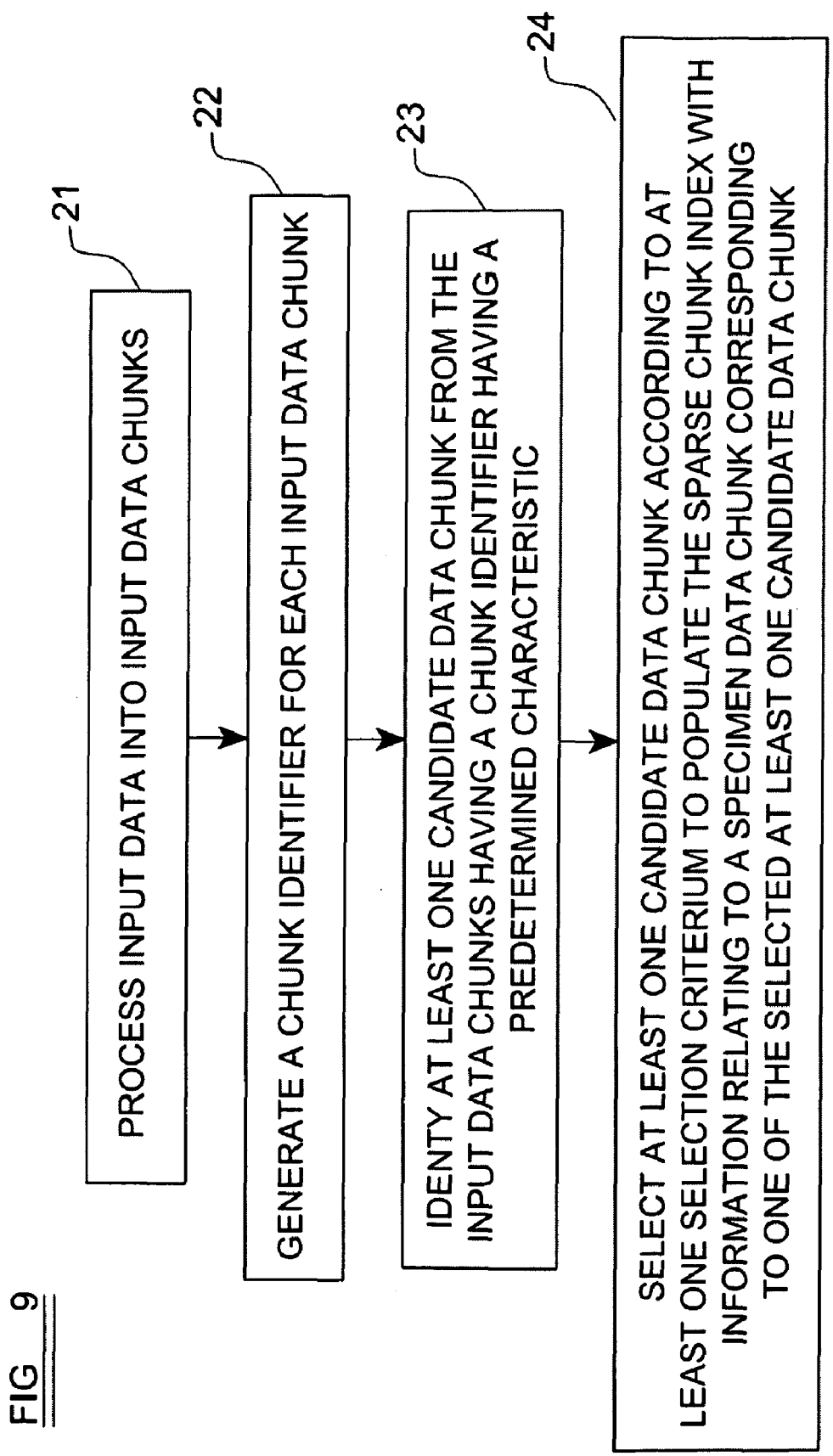

DATA PROCESSING APPARATUS AND METHOD OF PROCESSING DATA

CROSS-REFERENCE TO RELATED APPLICATION

This Utility patent application is based on and claims the benefit of U.S. Provisional Application No. 61/000,425, filed on Oct. 25, 2007 the contents of which are hereby incorporated by reference in their entirety.

BACKGROUND OF THE INVENTION

Data held on a primary data storage medium may be backed-up to secondary data storage medium. The secondary data storage medium may be in a different location to the primary data storage medium. Should there be at least a partial loss of the data on the primary data storage medium, data may be recovered from the secondary data storage medium. The secondary data storage medium may contain a history of the data stored on the primary data storage medium over a period of time. On request by a user, the secondary data storage medium may provide the user with the data that was stored on the primary data storage medium at a specified point in time.

Data back-up procedures may be carried out weekly, daily, hourly, or at other intervals. Data may be backed-up incrementally, where only the changes made to the data on the primary data medium since the last back-up are transferred to the secondary data storage medium. A full back-up may also be performed, where the entire contents of the primary data medium are copied to the secondary data medium. Many other back-up strategies exist.

When backing-up data, a particular part of the data being backed-up may have previously been stored to the primary data storage medium, which may especially be the case when full back-ups are carried out. Storing the same data numerous times represents an inefficient use of a data storage medium.

SUMMARY OF THE INVENTION

One embodiment of the present invention provides data processing apparatus comprising:

a chunk store containing specimen data chunks, a manifest store containing at least one manifest that represents at least a part of a data set and that comprises at least one reference to at least one of said specimen data chunks, a sparse chunk index containing information on only those specimen data chunks having a predetermined characteristic, the processing apparatus being operable to process input data into input data chunks and to use the sparse chunk index to identify at least one of said at least one manifest that includes at least one reference to one of said specimen data chunks that corresponds to one of said input data chunks having the predetermined characteristic.

In one embodiment, a specimen data chunk possesses said predetermined characteristic when that specimen data chunk's chunk identifier possesses said predetermined characteristic.

In one embodiment, the chunk identifier is a hash.

In one embodiment, a hash possesses said predetermined characteristic when at least M bits of that hash have a predetermined bit value.

In one embodiment, the apparatus is operable to analyse said identified at least one manifest and identify at least one reference to one of said specimen data chunks that corresponds to at least one other input data chunk of the input data set.

In one embodiment, the apparatus is operable to store an input data chunk in the chunk store as a specimen data chunk, should it be determined that a specimen data chunk corresponding to that input data chunk does not exist in the chunk store.

In one embodiment, the apparatus is operable to populate the sparse chunk index with information on said corresponding specimen data chunk if said specimen data chunk has said predetermined characteristic.

In one embodiment, said information contained in said sparse chunk index refers to at least one manifest in the manifest store comprising a reference to at least one of said specimen data chunks having said predetermined characteristic.

In one embodiment, said information contained in said sparse chunk index includes a chunk identifier of at least one of said specimen data chunks having said predetermined characteristic.

In one embodiment, one of the manifests in the manifest store further comprises a chunk identifier of each specimen data chunk referenced by that manifest.

In one embodiment, the apparatus is operable to generate and compare a chunk identifier of another input data chunk with the chunk identifiers in said manifest, to identify at least one reference to one of said specimen data chunks that corresponds to said other input data chunk of the input data set.

Another embodiment of the present invention provides data processing apparatus comprising:

a chunk store containing specimen data chunks, a manifest store containing at least one manifest that represents at least a part of a data set and that comprises at least one reference to at least one of said specimen data chunks, a sparse chunk index containing information on only some specimen data chunks, the data processing apparatus being operable to: process input data into input data chunks; identify at least one candidate data chunk from the input data chunks having a predetermined characteristic, select at least one candidate data chunk according to at least one selection criterion to populate the sparse chunk index with information relating to at least one specimen data chunks corresponding to the selected at least one candidate data chunk, the data processing apparatus being further operable to use the sparse chunk index to identify at least one manifest that includes at least one reference to one of said specimen data chunks corresponding to an input data chunk having the predetermined characteristic.

Another embodiment of the present invention provides data processing apparatus comprising:

a chunk store configured for containing specimen data chunks, a sparse chunk index, configured for containing information on only some specimen data chunks, the processing apparatus being operable to: process input data into input data chunks; identify at least one candidate data chunk from the input data chunks having a predetermined characteristic, select at least one candidate data chunk according to at least one selection criterion to populate the chunk index with information relating to at least one of the specimen data chunks corresponding to the selected at least one candidate data chunk.

In one embodiment, the apparatus is configured for containing information on only said at least one candidate data chunk.

In one embodiment, the apparatus is operable to select a candidate data chunk, according to the at least one selection criteria, based, at least in part, on the position in the input data of a previously selected candidate data chunk.

In one embodiment, a selection criterion is that there are at least a predetermined number of input data chunks between selected candidate data chunks.

In one embodiment, a selection criterion is that there are no more than a second predetermined number of input data chunks between selected candidate data chunks Another embodiment of the present invention provides a method of processing data using:

a chunk store containing specimen data chunks, a manifest store containing at least one manifest that represents at least a part of a data set and that comprises at least one reference to at least one of said specimen data chunks, a sparse chunk index containing information on only those specimen data chunks having a chunk identifier having a predetermined characteristic, the method comprising:

processing input data into input data chunks; and using the sparse chunk index to identify at least one manifest in the manifest store that includes at least one reference to a said specimen data chunk corresponding to at least one of said input data chunks having a chunk identifier having the predetermined characteristic.

In one embodiment, the method further comprises: analysing said identified at least one manifest and identifying at least one reference to a said specimen data chunk corresponding to at least one further input data chunk The present invention further provides a method of processing data using:

a chunk store configured for containing specimen data chunks, a sparse chunk index, configured for containing information on only some specimen data chunks, the method comprising:

processing input data into input data chunks;

generating a chunk identifier for each input data chunk;

identifying at least one candidate data chunk from the input data chunks having a chunk identifier having a predetermined characteristic; and selecting at least one candidate data chunk according to at least one selection criterion to populate the chunk index with information relating to a specimen data chunk corresponding to one of the selected at least one candidate data chunk.

BRIEF DESCRIPTION OF THE DRAWINGS

Embodiments of the invention will now be described, by way of example only, with reference to the accompanying drawings, in which:

FIG. 5 shows a schematic representation of other data sets;

FIG. 6(*a*) shows a schematic representation of another data set and FIG. 6(*b*) shows a schematic representation of a manifest; and FIG. 7 shows schematic representations of another data set;

FIG. 9 shows a flow chart of another method according to an embodiment.

DETAILED DESCRIPTION

Figure 1:
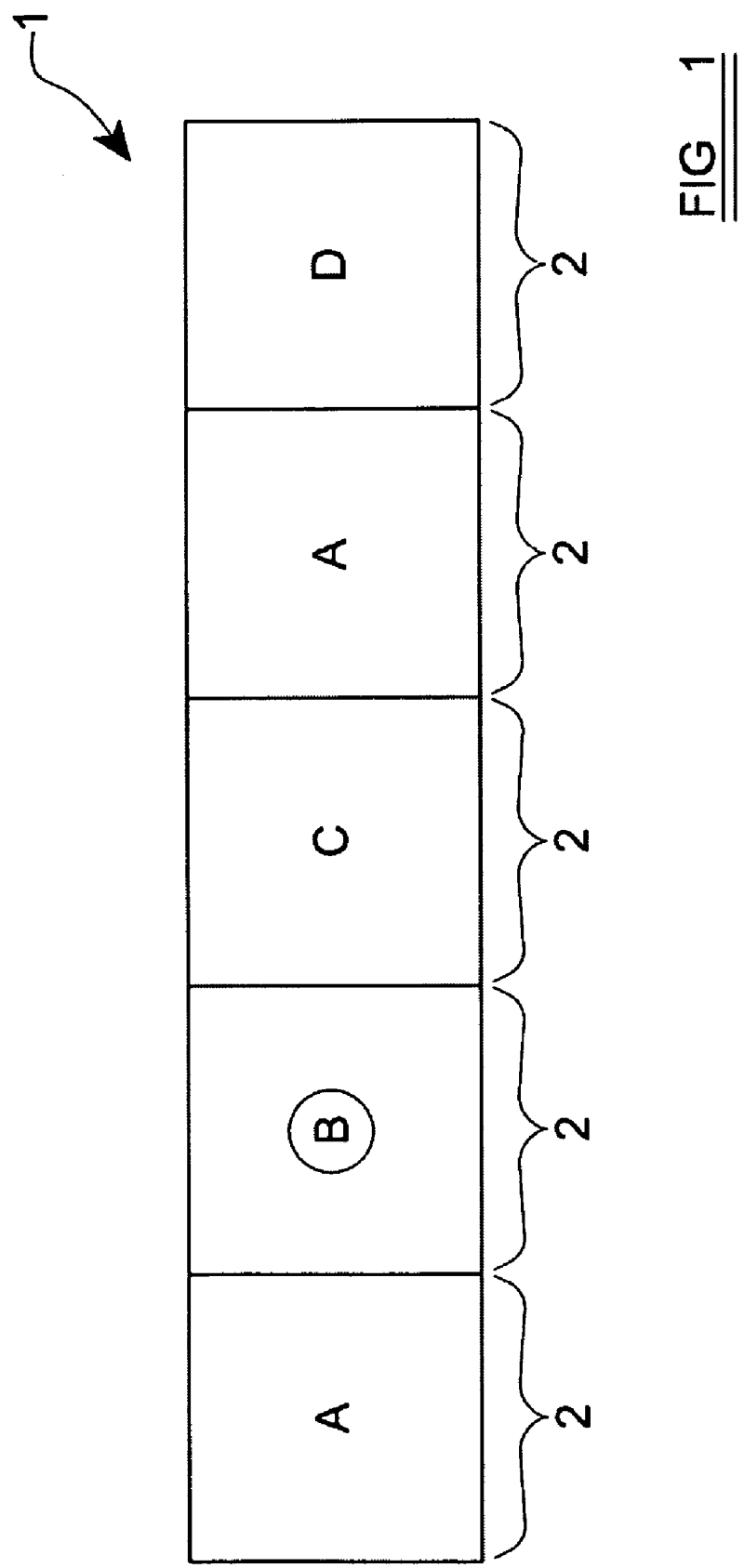
FIG. 1 shows a schematic representation of a data set.

FIG. 1 shows a schematic representation of a data set 1. A data set 1 may be shorter or longer than that shown in FIG. 1. A data set 1 comprises an amount of data, which may be in the order of 10 bytes, 1000 bytes, or many millions of bytes. A data set may represent all the data for a given back-up operation, or at least a part of a larger data set.

A back-up data set may comprise a continuous data stream or a discontinuous data stream. Whichever, the data set may contain many distinct, individual files or parts of files. The data set may not be partitioned into the individual files it contains. The data set may contain embedded information, comprising references to the boundaries of the individual files contained in the data set. The data set may then more easily be dissected into its constituent components. The size of the embedded information may represent a significant portion of the total data. Backing-up data with embedded file information increases the required capacity of the data storage medium.

Data processing apparatus according to an embodiment is operable to process an input data set into one or more input data chunks. An input data set may be divided into a plurality of input data chunks. Each input data chunk may represent an individual file, a part of an individual file, a group of individual files within the input data set, or several individual files plus parts of several others. The data set may be processed into input data chunks based on properties of the input data as a whole, with little or no regard to the individual files contained therein. The boundaries of data chunks may or may not be coterminous with file boundaries. The data chunks may be identical or varying in size.

FIG. 1 illustrates a schematic representation of an input data set 1 processed into data chunks 2. For convenience, each unique input data chunk is labelled in FIG. 1 from A to D. For the purposes of this application, when determining whether a chunk is unique we consider only its contents (i.e., the byte sequence in the data set 1 it was created from), not its position or location in an input data set. Note that for this example the first and fourth chunks in the data set 1 have the same content and are thus assigned the same label. Duplicated data in the data set 1 may give rise to repeated input chunks 2. The input data set 1 may be divided into more or different input data chunks 2 than those shown in FIG. 1. An input data set 1 may be many terabytes in size, and be processed into 1 billion input data chunks. There are specific schemes available to the skilled person to determine how the input data set 1 is processed into input data chunks 2 and which information each input data chunk 2 contains.

Figure 2:
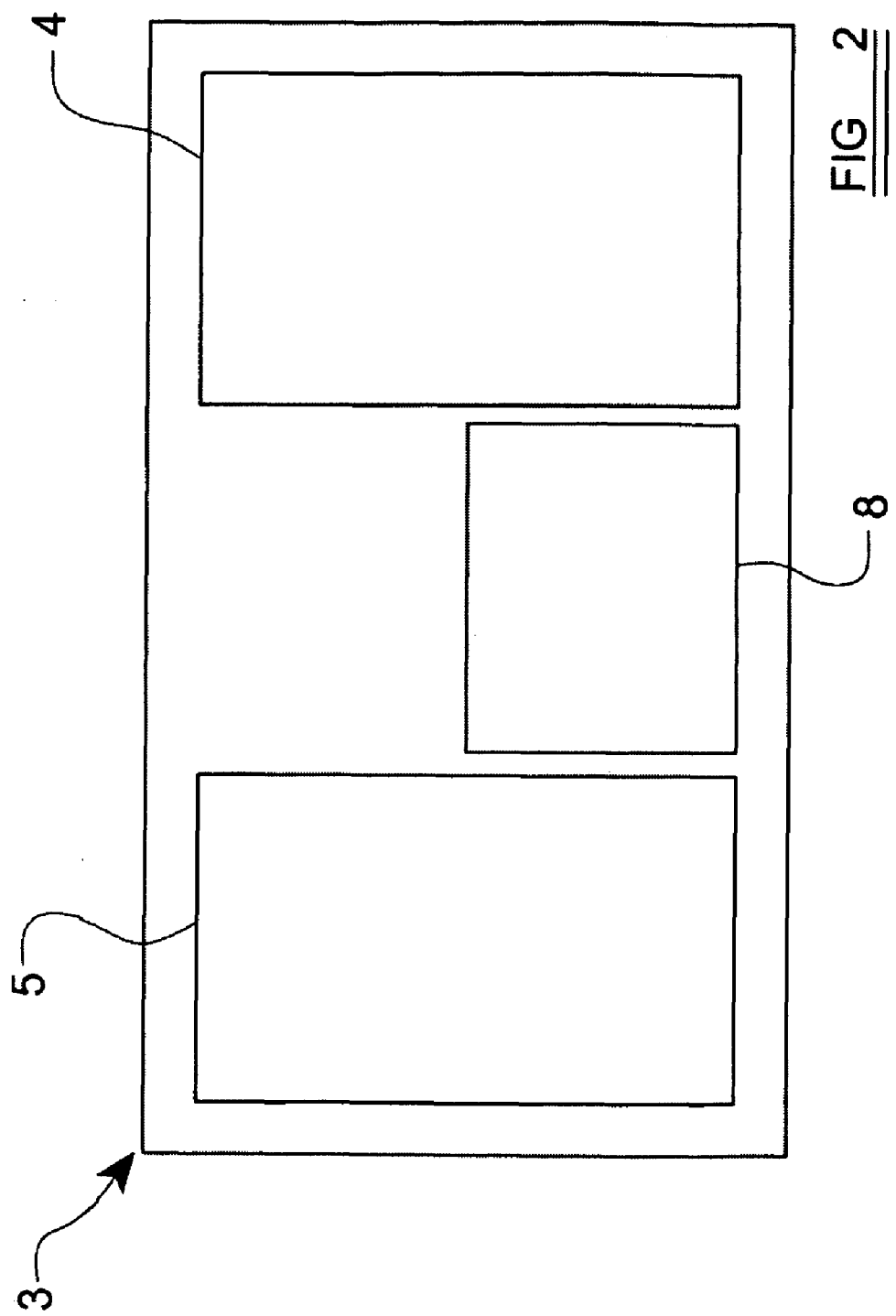
FIG. 2 shows a schematic representation of a data processing apparatus according to an embodiment.

FIG. 2 shows data processing apparatus 3 according to an embodiment. The data processing apparatus 3 comprises a chunk store 4, a manifest store 5 and sparse chunk index 8. The manifest store 5 may be discrete from, and separate to, the chunk store 4 but both stores 4, 5 may reside on a common data storage medium or memory device. In the example shown in FIG. 2, the chunk store 4, manifest store 5 and sparse chunk index 8 do not contain any data or information. How the data and information are populated in each of the chunk store 4, manifest store 5 and sparse chunk index 8 will now be described.

Figure 3:
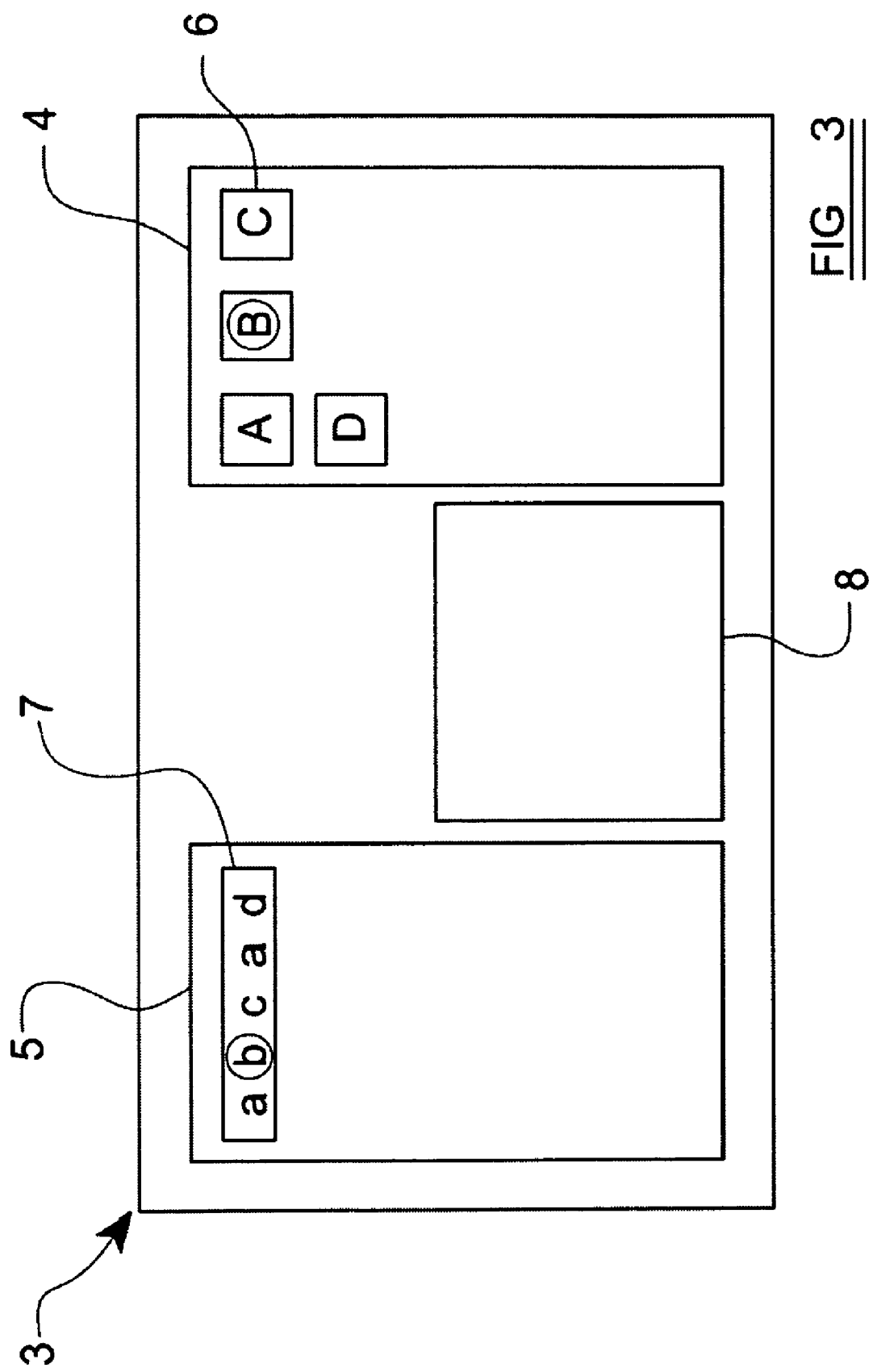
FIG. 3 shows a schematic representation of the data processing apparatus of FIG. 2, in use.

As an input data set 1 is processed by data processing apparatus 3, each input data chunk 2 is stored to the chunk store 4 as a specimen data chunk 6 if the data processing apparatus 3 determines that a corresponding specimen data chunk 6 is not already present, as shown in FIG. 3. It will be appreciated, in this example, that since the input data set 1 is the first to be processed, all the unique input data chunks will be added to the chunk store 4 as specimen data chunks 6 (i.e. one of each of B, C and D but only one of the two occurrences of input data chunk A). However, in subsequent operations, it may be determined that an input data chunk is already present in the chunk store 4 as a specimen data chunk 6; in which case no new additions to the chunk store 4 may be made.

A specimen data chunk 6 may be a carbon copy of an input data chunk 2. Alternatively, a specimen data chunk 6 may be a transformed copy of the corresponding input data chunk 2; for example, it may be an encrypted version of input data chunk 2 or have additional headers or metadata added. An input data chunk 2 and a specimen data chunk 6 may be considered to correspond if they contain the same contents. (The contents of an encrypted chunk are the corresponding unencrypted data.)

Note that although there are two input data chunks with contents A, only one specimen data chunk 6 with contents A is shown as stored to chunk store 4 in FIG. 3. This is because we have assumed for this example that the data processing apparatus determines when it reaches chunk four that it already has a corresponding specimen data chunk 6 in the chunk store 4 (added when chunk one was processed). The determining procedure may occasionally make mistakes, determining that a chunk is not present when it actually is, leading to some specimen data chunks 6 being added to the chunk store 4 multiple times. The chunk store 4 may store a plurality of specimen data chunks 6.

In one embodiment, both the chunk store 4 and manifest store 5 are stored in non-volatile storage. The sparse chunk index 8 may be stored on volatile storage, such as RAM.

As an input data chunk 2 is processed, a manifest 7 is compiled. A manifest 7 is a representation of a data set 1. The manifest 7 comprises references to specimen data chunks 6 in the chunk store 4 which correspond to the input data chunks 2 comprising the input data set 1. So, the references of the manifest 7 may be seen as metadata to specimen data chunks 6. If the references to specimen data chunks 6 of a given manifest 7 are smaller in size than the specimen data chunks 6 referred to by the manifest 7, then it will be appreciated that a manifest 7 may be smaller in size than the input data set 1 it represents. As more and more manifests are added to the manifest store 5, which manifests reference specimen data chunks already stored in the chunk store 4, the total combined size of the manifests and specimen data chunks may be smaller than the total combined size of the data sets the manifests represent because duplicated input chunks may be stored only once each.

When an input data set 1 has been processed into input data chunks 2 and a manifest 7 compiled, representing the input data set 1, the manifest 7 is stored in the manifest store 5, as shown schematically in FIG. 3. Here we represent a reference to a specimen data chunk 6 with content X (there will usually only be one) using the corresponding lowercase letter x.

If a user of data processing apparatus 3 wishes to recover the data of a given input data set 1, which may relate to a back-up made at a particular point in time—the apparatus will retrieve the corresponding manifest 7 from the manifest store 5. Each reference in the manifest 7 to specimen data chunks 6 in the chunk store 4 is then used to reconstruct the original data set 1.

Populating the Sparse Chunk Index: Chunk Identifiers

As each input data chunk 2 is processed, the sparse chunk index 8 may be populated with information on only the specimen data chunks 6 that correspond to those input data chunks 2 and that have a predetermined characteristic. If none of these specimen data chunks 6 have the predetermined characteristic, no information will be added to the sparse chunk index 8. The sparsity of the sparse chunk index 8 arises as a result of the index containing information on only specimen data chunks 6 having the predetermined characteristic and not containing information on specimen data chunks 6 not having the predetermined characteristic. For a given number of specimen data chunks 6 stored in the chunk store 4, there will thus usually be a smaller number of specimen data chunks 6 about which the sparse chunk index 8 contains information.

In one embodiment, a data processing apparatus is operable to generate a chunk identifier of an input data chunk. A chunk identifier may be a digital fingerprint of the data chunk to which it relates. The chunk identifier may be a unique chunk identifier, being unique for a particular data chunk. The algorithm for generating chunk identifiers may be selected so as to be capable of generating unique chunk identifiers for a predetermined number of data chunks. In one embodiment; the chunk identifier is generated using the SHA1 hashing algorithm. Other hashing algorithms may be used, such as SHA2. In one embodiment, the hashing algorithm is selected and configured such that it is substantially computationally infeasible to find two different data chunks that would produce the same chunk identifier. Thus, given the number of specimen data chunks 6 that it may be possible to add to the chunk store 4 in practice due to chunk store 4 size limitations, it may be extremely unlikely that two of the added chunks 6 may share the same chunk identifier.

In one embodiment, the chunk identifier of an input data chunk is the same as the chunk identifier of the corresponding specimen data chunk 6. This may be achieved by having the chunk identifier depend only on the given chunk's contents. In one embodiment, the sparse chunk index 8 contains information on only the specimen data chunks 6 having a chunk identifier with a predetermined selection characteristic.

In one embodiment, the algorithm for generating chunk identifiers is chosen so as to generate a unique chunk identifier for every possible specimen data chunk likely to be added to the chunk store 4. Thus, a 4-bit chunk identifier, having only 16 possible values, should not be chosen where more than 16 different specimen data chunks are likely to be added to the chunk store 4. Otherwise, two different specimen data chunks may be assigned the same chunk identifier. In one embodiment, the number of possible chunk identifier values is larger than the likely number of unique specimen data chunks to be stored in the chunk store 4.

In one embodiment, the predetermined characteristic is that the given chunk's chunk identifier has a value within a predetermined range; or above or below a predetermined value. In one embodiment, the predetermined characteristic is that the given chunk's chunk identifier has at least M bits set to a predetermined value. In one embodiment, they may all be set to 1. In one embodiment, the at least M bits may be adjacent one another. In another embodiment, the predetermined characteristic may be that the given chunk's chunk identifier has the M most significant bits (MSBs) set to 0.

For example, suppose (unrealistically) that a chunk identifier comprises 4 bits. There are thus 16 possible values for the chunk identifier. Selecting chunk identifiers with the first 3 bits set to 0, for example, will select values 0000 and 0001.

In another example, selecting chunk identifiers with the first 2 bits set to 0 will select four values (0000, 0001, 0010 and 0011).

Selecting chunk identifiers with M MSBs set to 0 causes a selection of 1 in every $2^M$ (2 to the power of M) chunk identifiers. Assuming that each specimen data chunk 6 stored in the chunk store 4 has an associated chunk identifier, such a selection mechanism may be used to populate the sparse chunk index 8 with information on only a selection of predetermined specimen data chunks 6 contained in the chunk store 4. Of course, there may exist a situation where the first specimen data chunks added to the chunk store 4 happen to have the predetermined characteristic. Nevertheless, as more and more unique specimen data chunks are added to the chunk store 4, the ratio of specimen data chunks having the predetermined characteristic in the chunk store 4, to those not having the predetermined characteristic in the chunk store 4, may stabilize. Where the predetermined selection characteristic is that the M MSBs of a chunk identifier are set to 0 and the distribution of chunk identifiers of input data chunks 2 is approximately uniformly random, the ratio will approach 1 in $2^M$ as more input data chunks are processed by the data processing apparatus.

The above embodiment makes a selection of the specimen data chunks 6 based on a property of their chunk identifiers and not directly on the specimen data chunks 6 themselves. In an embodiment where chunk identifiers depend only on the contents of the given chunk, this means that there is no regard given to the location of the specimen data chunk 6 in the chunk store 4, or the order in which the specimen data chunks 6 were added to the chunk store.

In one embodiment, the information contained in the sparse chunk index 8 for those specimen data chunks 6 having a predetermined characteristic includes the chunk identifier of each of those specimen data chunks 6. In an embodiment where the predetermined characteristic is that the given specimen data chunk's chunk identifier's M MSBs are set to 0, it will be appreciated that a portion of each chunk identifier in the sparse chunk index 8 will be identical; else it will not possess the predetermined selection characteristic. Thus, storing the full chunk identifier may not be necessary, since only a part of each chunk identifier stored in the sparse chunk index is unique to a predetermined specimen data chunk, the remainder being common to all predetermined specimen data chunk chunk identifiers in the sparse chunk index 8. Thus, in one embodiment, the sparse chunk index 8 may only store the unique part of each predetermined specimen data chunk chunk identifier. Thus, all but the M MSBs of each chunk identifier may be stored.

In some embodiments, part of the chunk identifier may be stored in the sparse chunk index 8 implicitly. That is, the location of the remaining part of the chunk identifier may implicitly specify the first part. For example, it is common in hash tables (the sparse chunk index 8 may be implemented as a hash table) for the first few bits of a key to specify which slot of the hash table information about that key is stored in; because every item in that slot has a key with the same first few bits, there is no need to explicitly store those bits.

In one embodiment, only a partial chunk identifier may be stored in the sparse chunk index 8. In one embodiment, the partial chunk identifier may be smaller in size than the unique part of each predetermined specimen data chunk chunk identifier. Thus, two different specimen data chunks may have the same partial chunk identifier. A disadvantage of storing only partial chunk identifiers is that the data processing apparatus may choose manifests poorly based on the misleading information in the sparse chunk index 8, leading to poorer deduplication (e.g., more extra copies of specimen data chunks 6 will exist in the chunk store 4). The apparatus may thus assume, by referring to the partial chunk identifiers in the chunk index 8, that a specimen data chunk corresponds to an input data chunk 2 being processed, even though they may be different.

However, embodiments of the present invention may include a verification step, described later. Such a verification step may discount specimen data chunks which do not correspond to an input data chunk 2, despite their respective partial chunk identifiers indicating that they correspond. An advantage of storing only partial chunk identifiers is that the size of the sparse chunk index 8 is reduced still further. This benefit is in addition to reduction in size of the sparse chunk index 8 as a result of only storing information on specimen data chunks 6 having a predetermined characteristic.

In one embodiment, the information contained in the sparse chunk index 8 for a specimen data chunk 6 (which must have the predetermined characteristic since the sparse chunk index 8 has information on it) includes a reference to every manifest 7 which is in the manifest store 5 and includes a reference to that specimen data chunk 6. That is, for each specimen data chunk 6 having an entry in the sparse chunk index 8, there is stored a list of manifests 7 in the manifest store 5 which contain at least one reference to that specimen data chunk 6. In another embodiment, there may be stored only a partial list of the manifests 7 in the manifest store 5 which contain at least one reference to that specimen data chunk. Thus, although there may be many manifests stored in the manifest store which include a reference to a specimen data chunk 6 having an entry in the sparse chunk index 8, the sparse chunk index 8 may only contain details on a limited number of those manifests.

In use, the manifest store 5 may contain many manifests 7, each representing a previously processed data set 1. In one embodiment, the manifest store 5 contains information relating to each manifest 7 contained therein. The information may include the properties associated with each manifest 7; such as its size, the number of references it contains or the name and other details of the data set which it represents. The information for a particular manifest may include a chunk identifier of at least one of the specimen data chunks 6 referenced by the manifest 7

Deduplication: Hooking

The data processing apparatus 3 uses the sparse chunk index 8 and the manifest 7 in an attempt to identify which input data chunks 2 already have corresponding specimen data chunks 6 in the chunk store 4. As a consequence, in one extreme embodiment, there may be stored only one copy of each unique specimen data chunk 6, regardless of how may times input data chunks corresponding to that specimen data chunk 6 appear in input data sets being processed. The process of eliminating, or at least reducing, the multiple storage of data is called deduplication (sometimes also referred to as compaction). We describe two methods of doing this in this application, which we call hooking (preferred) and zipping, but our invention is not limited to these. We will first describe how the data processing apparatus 3 works when using hooking, then will describe how things differ when using zipping.

Figure 4:
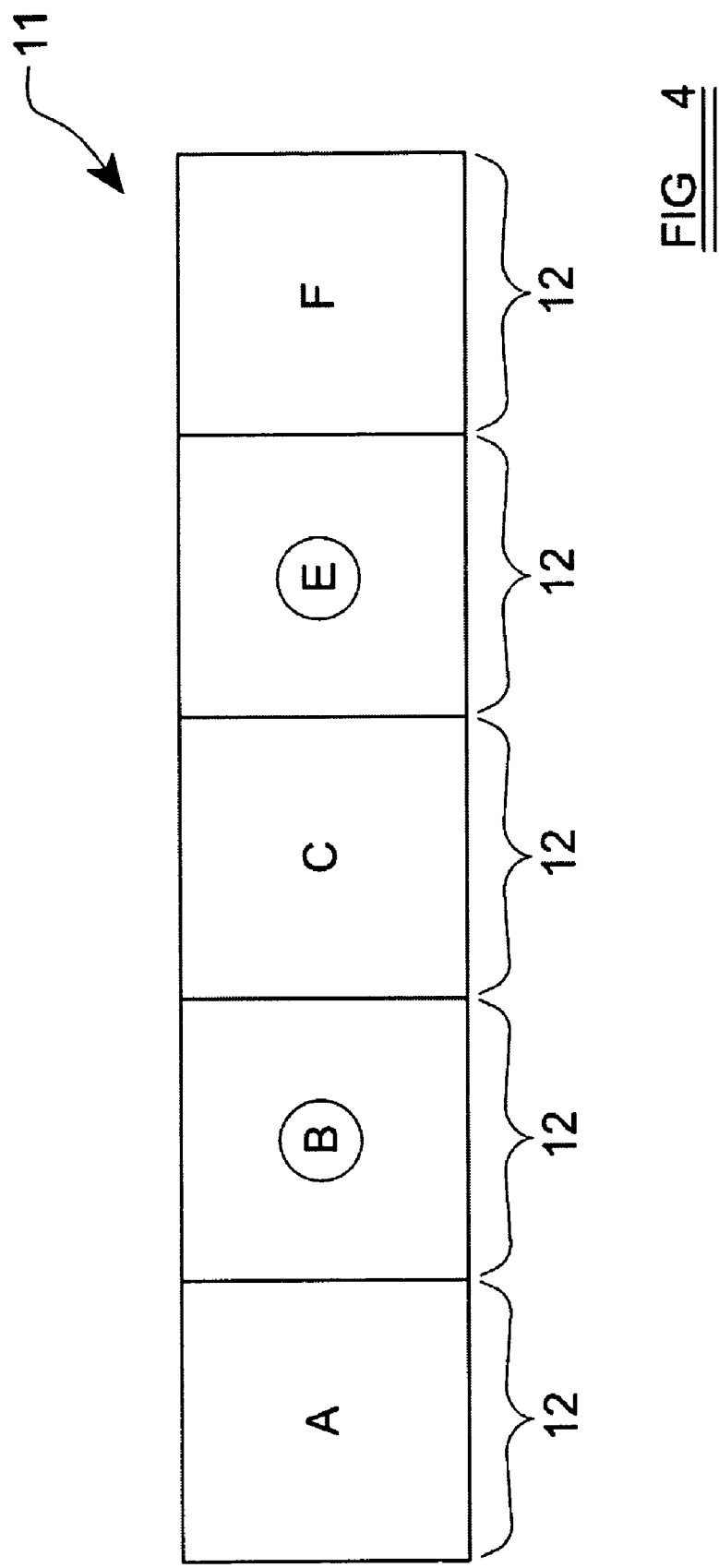
FIG. 4 shows a schematic representation of another data set.

A schematic representation of a second input data set 11 to be subsequently processed is illustrated in FIG. 4. Without data processing apparatus 3 according to an embodiment, the second input data set 11 may be stored in its entirety. Thus, even though it can be seen by the reader that both input data sets 1, 11 comprise the common input data chunks A, B and C, both occurrences of each would be stored, which is an inefficient use of a data storage medium. How data processing apparatus according to an embodiment is operable to reduce the duplication of data will now be described.

With data processing apparatus 3, when the input data set 11 is presented to the data processing apparatus 3, the input data set 11 is processed into input data chunks 12. A data processing apparatus 3 is operable to use the sparse chunk index 8 to identify at least one manifest 7 in the manifest store 5 that includes at least one reference to a specimen data chunk 6 corresponding to at least one of the input data chunks 12 of the second input data set 11 having said predetermined characteristic, as described below.

As shown in FIG. 3, before processing the input data set 11 shown in FIG. 4, the chunk store 4 contains specimen data chunks A, B, C and D, which represent each of the input data chunks 2 in the input data set 1 shown in FIG. 1. (A represents two input data chunks 2.) In addition, the manifest store 5 includes a manifest 7 representative of input data set 1, comprising references to each of the specimen data chunks 6 stored in the chunk store 4. The input data set 1 of FIG. 1 may be rebuilt using the manifest 7 in the manifest store 5 and the specimen data chunks 6 in the chunk store 4.

In addition, the sparse chunk index 8 is configured for containing information on only those specimen data chunks 6 having a predetermined characteristic. In one embodiment, the predetermined characteristic depends only on the chunk identifier of the given specimen data chunk 6.

Suppose, for this example, that of the specimen data chunks A, B, C and D, only the chunk identifier for specimen data chunk B has the required predetermined characteristic; we indicate chunks/chunk identifiers having the predetermined characteristic in our figures by circling their labels. None of the specimen data chunks A, C or D thus has the predetermined characteristic. Thus, the sparse chunk index 8 may contain information only on specimen data chunk B. In one embodiment, the information may comprise the chunk identifier, or partial chunk identifier, of specimen data chunk B and further at least a partial list of manifests in the manifest store which comprise a reference to specimen data chunk B □ in another embodiment, there may be a full list of manifests. In the example shown in FIG. 3, there is only one manifest currently contained in the manifest store. Thus, in the sparse chunk index 8, against the entry for specimen data chunk B, there will be stored a reference to the manifest 7 stored in the manifest store 5. If any of specimen data chunks A, C and D also had the predetermined characteristic, then information relating to those specimen data chunks may also have been added to the sparse chunk index 8. However, for this example, it is assumed that only specimen data chunk B has the predetermined characteristic, as described above. We assume for this example that full chunk identifiers are used.

Data processing apparatus 3, on receiving the input data set 11 of FIG. 4, is operable to divide the input data set 11 into input data chunks 12. For each input data chunk 12, a chunk identifier is generated. From the chunk identifiers generated, at least one having a predetermined characteristic may be identified. As described above, input data chunk B of input data set 1 was found to have a chunk identifier with a predetermined characteristic. Accordingly, it will be found that the chunk identifier of input data chunk B, of input data set 11, will also have the predetermined characteristic. It will be noted that neither of input data chunks A or C of input data set 1 were found to have the predetermined characteristic, so neither of input data chunks A or C of input data set 11 will have the predetermined characteristic. In addition, suppose that input data chunk E but not chunk F of input data set 11 also has the predetermined characteristic.

After identifying that input data chunks B and E of input data set 11 have the predetermined characteristic, the data processing apparatus is operable to search the sparse chunk index 8 for entries corresponding to input data chunks B and E. This search may be performed by comparing the chunk identifier of input data chunks B and E with the (possibly partial) chunk identifiers stored in the sparse chunk index 8. Since in the example described above, there is only one entry in the sparse chunk index 8, only two comparison steps may be made: the comparison of the chunk identifier of each of input data chunks B and E with the chunk identifier stored in the sparse chunk index 8. In one embodiment, the data processing apparatus 3 may search for only a subset of the input data chunks 12 found to have the predetermined characteristic.

As a result of comparing the chunk identifier of input data chunks B and E with the chunk identifier stored in the sparse chunk index 8, it may be determined that there exists a specimen data chunk 6 in the chunk store 4 corresponding to input data chunk B. From the sparse chunk index 8, the data processing apparatus will identify, from the sparse chunk index 8, a list of manifests containing references to specimen data chunk B. Each searched for input data chunk 12 may give rise to a list of manifests, which are then combined into a single list where each manifest is listed at most once. Where partial chunk identifiers are used in the sparse chunk index 8, a larger list of manifests may be returned, since some manifests may have been incorrectly returned as having a reference to a specimen data chunk corresponding to an input data chunk, as a result of using partial chunk identifiers. Where at least one manifest is returned, the at least one manifest may be utilized by the data processing apparatus to compact a data set (i.e. eliminate or reduce duplicates).

Accordingly, the manifest 7 already stored in the manifest store will be identified by the data processing apparatus. The data processing apparatus is operable to analyse the returned manifests in order to make a determination of which input data chunks are already present in chunk store 4. In some embodiments, only a subset of the returned manifests may be so analyzed. In one embodiment, the data processing apparatus is operable to review the returned at least one manifest and identify at least one reference to a specimen data chunk 6 corresponding to at least one other input data chunk of the input data set 11. For example, there may be identified references to specimen data chunks 6 corresponding to further input data chunks of the input data set.

In one embodiment, each input data chunk 12 of the input data set 11 is compared with each specimen data chunk 6 referenced by the returned manifests 7. It should be appreciated that, having identified these manifests, the data processing apparatus is operable to compare each and every input data chunk 12 of the input data set 11 with each and every specimen data chunk referenced by the identified manifests, not just those input data chunks 12 or specimen data chunks having the predetermined characteristic.

In one embodiment, the full chunk identifier of each input data chunk 12 may be compared with the full chunk identifiers of each specimen data chunk 6 referenced in the identified manifests. In one embodiment, described above, the manifest may contain the chunk identifier for each specimen data chunk 6 referenced by the manifest. Accordingly, the comparison step may be performed by using only the information contained in a returned manifest and the chunk identifiers generated for the input data set 12. A benefit of this is there may be no need to refer to the sparse chunk index 8 or the chunk store 4 for further information.

With the example shown in FIG. 4, by comparing each of the input data chunks 12 of the input data set 11 with the specimen data chunks 6 referenced by the returned manifests, it may be determined that input data chunks A, B, and C have corresponding specimen data chunks A, B, and C already stored in the chunk store 4. In one embodiment, it will be determined that the chunk identifiers of input data chunks A, B, and C are identical to the chunk identifiers contained in the manifest, which references corresponding specimen data chunks A, B, and C in the chunk store 4.

In any event, the data processing apparatus may determine that specimen data chunks 6 corresponding to input data chunks A, B, and C of input data set 11 already exist. Accordingly, specimen data chunks corresponding to input data chunks A, B, and C of input data set 11 need not be stored again in the chunk store 4.

A data processor according to an embodiment is operable to compile a manifest for the input data set 11. As described above with reference to the example shown in FIG. 4, it has been determined that the chunk store 4 already contains specimen data chunks A, B and C, which correspond to input data chunks A, B and C. A manifest for the input data set 11 may therefore be compiled with references to those specimen data chunks 6. A benefit of this is that a portion of the manifest for input data set 11 has already been compiled, without any further specimen data chunks 6 having been added to the chunk store 4. There is thus no duplication of data in the chunk store 4. The footprint of storing the first 1 and second 11 input data sets using the data processing apparatus may be smaller than the footprint of storing the first 1 and second 11 input data sets without using the data processing apparatus according to an embodiment.

Another benefit of the above described embodiment is that the manifest was identified from just one input data chunk 12 matching a specimen data chunk in the chunk store 4 in this case. The operation of some embodiments of the invention using hooking under some embodiments can be thought of, conceptually, as attaching hooks to manifests at each reference to a specimen data chunk with the predetermined characteristic; each hook matches the corresponding input data chunk. Thus, when a data set is processed, manifests which reference specimen data chunks corresponding to an input data chunk having a predetermined characteristic are "pulled in" for analysis. The more hooks of a given manifest that match, the more likely it is to be pulled in and, as a result of having more hooks, the more useful it likely is for deduplication.

As the new manifest is compiled, representative of input data set 11, information on the manifest may be added to the sparse chunk index 8. This is because the new manifest comprises a reference to specimen data chunk B. Accordingly, the sparse chunk index 8 may be updated to record that both of the manifests 7 (the existing manifest and the new manifest for input data set 11) in the manifest store comprise references to specimen data chunk B.

It will be noted that input data set 11 also contains input data chunks E and F. Although it was determined that input data chunk E has a predetermined characteristic, there was no entry in the sparse chunk index 8 relating to a corresponding specimen data chunk. It may therefore be assumed that specimen data chunk E does not already exist in the chunk store 4

The data processing apparatus is operable to add input data chunks E and F to the chunk store 4, as specimen data chunks 6. The manifest for input data set 11 may then be completed by adding references to the corresponding specimen data chunks 6.

Since specimen data chunk E has the predetermined characteristic, information relating to the specimen data chunk E may be added to the sparse chunk index 8. In addition, there may be recorded against the entry in the sparse chunk index 8 for E that specimen data chunk E is referenced by the newly added manifest 7 in the manifest store. In one embodiment, the sparse chunk index 8 may then contain the chunk identifiers of both specimen data chunks B and E.

Accordingly, should any subsequent input data sets contain input data chunk B, corresponding to specimen data chunk B, the data processing apparatus will identify that both manifests stored in the manifest store comprise references to specimen data chunk B. Likewise, if a subsequent input data set comprises input data chunk E, the data processing apparatus will identify that the newly added manifest (i.e. that relating to input data set 11) comprises a reference to specimen data chunk E.

During processing of subsequent input data sets, in the case where two manifests containing a reference to a given specimen data chunk 6 are identified, the returned two manifests may be prioritised for processing. For example, if an input data set comprises both input data chunks B and E, the manifest which comprises references to specimen data chunks corresponding to both may first be analysed for references to specimen data chunks corresponding to other input data chunks of an input data set, before the manifest which references only specimen data chunk B is analysed.

A benefit of the sparse chunk index 8 containing entries for both specimen data chunks B and E is that if any future input data sets to be processed include input data chunks corresponding to either specimen data chunks B or E, the data processing apparatus will identify at least one manifest that includes a reference to the respective specimen data chunks B or E.

A benefit of data processing apparatus 3 is that an exhaustive search of the chunk store 4 for each and every input data chunk 2, to determine whether it has already been stored as a specimen data chunk 6, is not required. Instead, data processing apparatus 3 may utilize the manifests 7 created for previously processed and stored data sets. The benefits of data processing apparatus 3 are further demonstrated when the input data sets being processed are similar, to a large extent, to previously processed data sets. For example, between two full back-up operations, only a small portion of the respective data sets may be different. To have to methodically search through each specimen data chunk 6 stored in the chunk store 4, to find specimen data chunks 6 corresponding to each input data chunk of an input data set, may be inefficient and time consuming.

Data processing apparatus 3 may be able to exploit the fact that each input data set 1 being processed may be similar. As such, previous similar manifests can be used to compile at least a part of a new manifest for the latest input data set.

In one embodiment, having identified said at least one manifest, the data processing apparatus 3 is operable to search within those manifests for all other references to specimen data chunks 6 in the chunk store 4 that correspond to other input data chunks of an input data set being processed. In one embodiment, the search is performed by selecting each input data chunk from an input data set in turn, save possibly for the input data chunks having the predetermined characteristic, and comparing it with each reference in the identified manifests. When a reference to a corresponding specimen data chunk 6 is found, the corresponding input data chunk is represented in a new manifest with a reference to the specimen data chunk 6. The search operation may continue until all input data chunks have been compared with all references in the identified manifest(s).

In another embodiment, the search operation may be terminated when, for a given manifest, a predetermined number of references to specimen data chunks 6 corresponding to input data chunks have been found. The search operation may search the identified manifests one at a time. The manifests expected to be most useful may be searched first. In one embodiment, the search operation may be terminated when the current manifest being searched is found to have fewer than a predetermined number (possibly a percentage of the number of input data chunks or references in the current manifest) of references to specimen data chunks 6 corresponding to the input data chunks. In another embodiment, the search operation may be terminated when the current manifest being searched is found to have fewer than a predetermined number of references to specimen data chunks 6 corresponding to input data chunks not already determined to have corresponding specimen data chunks 6 in the chunk store 8. A benefit of these embodiments is that manifests that do not contain references to specimen data chunks 6 corresponding to any other input data chunks may quickly be discounted from the search procedure.

A benefit of an embodiment of the invention is demonstrated when the chunk store 4 contains many specimen data chunks 6. Suppose that many of the specimen data chunks 6 have been stored in the chunk store 4 for a long period of time and new input data sets being presented to the processor no longer include input data chunks 2 which correspond to those "old" specimen data chunks 6. Suppose further that a number of the most recently processed input data sets 1 contain references to the most recently added specimen data chunks 6 to the chunk store 4. Without data processing apparatus 3, each and every input data chunk of a new input data set may be compared with each specimen data chunk 6 stored in the chunk store 4. Such data processing apparatus, not embodying the present invention, would, therefore, compare input data chunks with specimen data chunks 6 which are unlikely to be found to match. This would especially be the case where the "old" specimen data chunks 6 are stored at the beginning of the chunk store 4, and are therefore likely to be searched first.

Data processing apparatus 3, on the other hand, may identify at least one manifest 7 in the manifest store 5 that includes at least one reference to a specimen data chunk 6 corresponding to at least one input data chunk 2 having a predetermined characteristic. Embodiments of the present invention, therefore, can exploit the fact that input data sets containing a particular input data chunk having a predetermined characteristic, which input data chunk corresponds to a specimen data chunk 6 already in the chunk store 4, may also contain input data chunks which correspond to other specimen data chunks 6 already stored in the chunk store 4 (but not necessarily having the predetermined characteristic).

In one embodiment of the present invention, after generating a chunk identifier for an input data chunk 2, and identifying a corresponding chunk identifier in the sparse chunk index 8 relating to a specimen data chunk 6 stored in the sparse chunk index 8, data processing apparatus 3 is operable to perform a verification procedure. The verification procedure comprises comparing the input data chunk 2 with the identified specimen data chunk 6 stored in the chunk store 4, to confirm whether the two data chunks in fact have the same contents. Without the verification procedure, and especially where partial chunk identifiers are used, it may be that a specimen data chunk 6 identified as "corresponding" actually has different content than the input data chunk 2. To include a reference to the non-corresponding specimen data chunk 6 will introduce an error in the manifest, and prevent accurate restoration of data represented in the manifests.

In another embodiment, the verification procedure may be performed by comparing the chunk identifier of an input data chunk with a chunk identifier contained in an identified manifest. A benefit of this is that no access to chunk store may be required at all. The verification procedure may be performed using solely the information contained in the manifest and the chunk identifiers produced for the input data chunks. Where partial chunk identifiers are stored in the sparse chunk index 8, a situation may exist where the chunk identifier of an input data chunk matches the partial chunk identifier of a specimen data chunk stored in the sparse chunk index 8, even though the respective input/specimen data chunks do not match one another. As a consequence, the manifests identified as containing a reference to a specimen data chunk corresponding to an input data chunk may, not, in fact reference specimen data chunks corresponding to any input data chunks. In one embodiment, the data processing apparatus is operable to perform a verification procedure on the identified manifest(s). In one embodiment, when at least one manifest has been identified, the chunk identifier stored in the manifest(s) of the specimen data chunk which was indicated as corresponding to an input data chunk is verified. Only if the chunk identifier is identical to the chunk identifier of the input data chunk may the manifest be used for subsequent operations. This embodiment may achieve the same effect as performing the verification procedure by reading from the chunk store 4, but does not require access to the chunk store 4. It will be appreciated that the returned manifest may be much smaller in size than the chunk store 4. Accordingly, performing a comparison procedure using the identified manifest, and not the chunk store 4, may allow for at least a part of the data for comparison to be processed whilst in RAM.

The data processing apparatus may be used in compacting input data sets 1 for storage, encryption or transmission. For example the input data 1 may represent sets of back-up data from a first data storage medium, for storing on a second data storage medium. Data processing apparatus 3, as described above, compares a chunk identifier of an input data chunk 2 having a predetermined characteristic with the chunk identifiers stored in a sparse chunk index 8 (also having the predetermined characteristic). The step of comparison may require ready access to the data contained in the sparse chunk index 8. In one embodiment, the sparse chunk index 8 may be stored in random access memory (RAM). RAM allows quick, and random, access to the information contained therein. There may be a requirement, however, to reduce the RAM required for a data processing apparatus. By providing a sparse chunk index 8 to be stored in RAM, the data processing apparatus requires less RAM than processing apparatus without a sparse index.

Without providing a chunk index, data processing apparatus may compare an input data chunk 2 with each specimen data chunk 6 stored in the chunk store 4. Since the chunk store 4 may be very large, it may be difficult, or simply not possible, to store the entire contents of the chunk store 4 in RAM. The chunk store 4 may be stored in non-volatile memory, such as on disk. Reading data from the chunk store 4, therefore, will require a disk reading operation. This may be significantly slower than accessing data stored in RAM. Data processing apparatus 3 comprises a sparse chunk index 8, which may reside in RAM, allowing faster access to the information contained therein. As a result, specimen data chunks 6 stored in the chunk store 4 which correspond to an input data chunk 2 may more easily be identified, without requiring constant direct access to the chunk store 4. There may, as described above, be a verification procedure. This operation will require access to a specimen data chunk 6 stored in the chunk store 4, on disk, but this may require only one disk seek of the chunk store 4 and the retrieval of a single specimen data chunk 6.

With embodiments of the present invention comprising a sparse chunk index 8, for a first input data chunk, there may exist a first specimen data chunk 6 in the chunk store 4 corresponding to the first input data chunk; but there is no entry relating to the first specimen data chunk 6 in the sparse chunk index 8. This may be because the first specimen data chunk does not have the predetermined characteristic. There may, however, be an entry in the sparse chunk index 8 for a second specimen data chunk 6 matching a second input data chunk, which does have the predetermined characteristic. The data processing apparatus will then identify the manifest(s) which reference the second specimen data chunk 6. A subsequent search of those manifest(s) may be carried out. It may be that the identified manifest(s) do not contain references to the first specimen data chunk. Or, any search operation within the manifest(s) may have been terminated before finding a reference to the first specimen data chunk 6, even though a manifest may contain a reference to the first specimen data chunk 6.

It may be that the stored manifests which reference the first corresponding specimen data chunk 6 do not reference the second specimen data chunk 6. In which case, the data processing apparatus would not identify the first specimen data chunk 6 when analysing the manifests containing the second specimen data chunk 6.

Consequently, the data processing apparatus may store the first input data chunk in the chunk store as a new specimen data chunk 6, despite that there is already a specimen data chunk 6 in the chunk store 4 corresponding to the input data chunk.

Nevertheless, the benefits of requiring less RAM, and the decrease in the time taken to search through the sparse chunk index 8 may outweigh the disadvantages of the storage of some input data chunks 2 as specimen data chunks 6 for the second time.

The data processing apparatus may be operable to identify specimen data chunks 6 in the chunk store 4 corresponding to at least some input data chunks 2, whilst only comprising a sparse index. There may be no duplicate entries in the chunk store 4. Data processing apparatus 3 with a sparse chunk index 8 may be just, or almost, as efficient at compacting input data as a data processor 3 with a full chunk index 8. By efficient is meant that the specimen data chunks 6 stored in the chunk store 4 are not duplicated, or at least not duplicated to a predetermined extent. Some duplication of specimen data chunks may be permitted. Further, some misidentification of manifests 7 comprising a reference to a specimen data chunk 6 corresponding to an input data chunk may be permitted. Embodiments of the present invention may be configured according to the balance of convenience; the envisaged disadvantage of allowing some duplication of data or misidentification of manifests 7 may be balanced, or outweighed, by the corresponding decrease in the size of sparse chunk index 8 required, or the corresponding increase in efficiency of the apparatus as a whole.

A benefit of some embodiments of the present invention may be demonstrated with reference to FIG. 5. FIG. 5(*a*) shows input data set 13 and FIG. 5(*b*) shows input data set 14. Suppose that input data set 13 is processed by the data processing apparatus first, and that the chunk store 4, manifest store 5, and sparse chunk index 8 are empty beforehand.

Suppose further that, as with the above example, input data chunks B and E have the predetermined characteristic, indicated by encircling, as before. Accordingly, information relating to the specimen data chunks 6 corresponding to each input data chunk B and E may be added to the sparse chunk index 8.

Then, suppose that input data set 14 is processed by the data processing apparatus. At least input data chunks B and E would again be identified as having the predetermined characteristic. Accordingly, the manifest representing input data set 13 will be identified and the data processing apparatus will determine that there exist in the chunk store 4 specimen data chunks 6 corresponding also to input data chunks A, B, C, D and E. A manifest for input data set 14 may be partially compiled. It should be noted that in the input data set 14, there are at least two input data chunks having the predetermined characteristic. Further, two of the corresponding specimen data chunks 6 are referenced by the manifest for input data chunk 13. Accordingly, data processing apparatus may use the information in the sparse chunk index 8 for either specimen data chunk B or E and, in any event, the manifest for input data set 13 will be identified. Thus, the data processing apparatus need only have identified one of the entries of specimen data chunks B and E, and the manifest for input data set 13 would have been found.

In addition, suppose that input data chunk H of input data set 14 has the predetermined characteristic. Accordingly, information relating to a specimen data chunk 6 corresponding to input data chunk H may be added to the sparse chunk index 8.

The sparse index of embodiments of the present invention is configured for containing information on only those specimen data chunks 6 having a predetermined characteristic. In addition, only input data chunks 2 having the predetermined characteristic are compared with the entries in the sparse chunk index 8.

Referring to FIG. 5, a benefit of the data processing apparatus populating the sparse chunk index 8 only with information on specimen data chunks 6 having a predetermined characteristic, is that even though input data chunks B and E are found further along in the input data set 14 than they appeared in input data set 13, the data processing apparatus is still operable to identify input data chunks B and E. Thus, in selecting input data chunks B and E from input data set 14, it will be determined that there already exist entries in the sparse chunk index 8 for these specimen data chunks 6. Consequently, the existing entries in the sparse chunk index 8 allow the data processing apparatus to identify previously stored manifests. No extra entries in the sparse chunk index 8 need have been made for deduplicating the run of input data chunks A to E.

In one embodiment of the present invention, the processing apparatus is operable to: process input data into input data chunks; identify at least one candidate data chunk from the input data chunks having a predetermined characteristic, select at least one candidate data chunk according to selection criteria to populate the chunk index with information relating to a specimen data chunk corresponding to the selected at least one candidate data chunk.

Deduplication: Zipping

Whereas ⟦hooking⟧ may compare all remaining input data chunks 12 not yet known to have corresponding specimen data chunks 6 in the chunk store 4 to an entire manifest at a time, ⟦zipping⟧ may limit how much of the manifest(s) is compared with input data chunks.

In an embodiment using zipping, data processing apparatus 3 first selects one of the input data chunks 12 having the predetermined characteristic. In one embodiment, this is the first such input data chunk 12. The data processing apparatus 3 uses this selected input data chunk 12 to identify manifests referencing specimen data chunks 6 corresponding to the selected input data chunk 12 by consulting the sparse chunk index 8 in the usual way. The manifests 7 are then ordered, possibly via heuristics intended to place those most likely to be useful first.

The data processor apparatus 3 searches the first such manifest 7 in the ordering for references to the specimen data chunk 6 corresponding to the selected input data chunk 12. At least one such reference must exist unless partial chunk identifiers are being used. If partial chunk identifiers are being used, as noted above, there may exist a situation where a partial chunk identifier identified in the chunk index 8 is incorrectly indicated as matching a chunk identifier of an input data chunk, thereby returning manifests which do not, in fact, contain references to specimen data chunks 6 which match any of the input data chunks having a predetermined characteristic.

If a reference is found, however, the data processor apparatus 3 determines that the selected input data chunk 12 has a corresponding specimen data chunk 6 in the chunk store 8. Assuming at least one such reference is found, the data processor apparatus 3 chooses one of the at least one such reference and compares the references adjacent to it with the correspondingly placed input data chunks 12 adjacent to the selected input data chunk 12. Matches result in the matched input data chunks 12 being determined to have corresponding specimen data chunks 6 in the chunk store 8.

For example, referring again to FIG. 4, suppose that input data chunk B was selected by the data processing apparatus 3; and the manifest 7 stored in the manifest store 5 identified as above. Because the manifest contains a reference b to the specimen data chunk 6 corresponding to input data chunk B, the data processor apparatus 3 determines that input data chunk B corresponds to a specimen data chunk 6 contained in the chunk store 8. It will be noted that adjacent to the reference 'b' in the manifest 7 are references a and c to specimen data chunks A and C. Similarly, adjacent input data chunk B in input data set 11, are input data chunks A and C. The data processor apparatus 3 compares reference 'a' to input data chunk A and reference 'c' to input data chunk C, finding two matches, and determines that both A and C have corresponding specimen data chunks 6 in chunk store 8.

If a match is found, data processor apparatus 3 similarly compares the next adjacent reference to the matched reference/correspondingly positioned input data chunk. In our example, this means comparing 'a' to E (fails). There is no reference to the left of the first reference 'a' so no comparison can be made there. This behaviour is repeated as long as matches continue to be found. In the example, had the fourth chunk of data set 11 been A rather than E, it would have been determined to have a corresponding specimen data chunk 6 in the chunk store 8 and 'd' would have been compared with F, which would fail, stopping these match comparisons.

The above described technique may be referred to as "zipping" in that an input data set 1 and an identified manifest 7 are arranged such that an input data chunk 2 is aligned with the reference in the manifest 7 to a specimen data chunk 6 in the chunk store 4 corresponding to the input data chunk 2 (both of which have the predetermined characteristic). The data processing apparatus 3 then seeks to "zip" the input data set 1 and manifest 7 together. A successful "zipping" procedure will result where a run of input data chunks 2 correspond to a run, of equal size, of references to specimen data chunks 6 in a manifest 7. The input data set 1 and manifest 7 may not successfully "zip" together where a particular input data chunk 2 does not correspond to the reference to a specimen data chunk 6 in a manifest 7 attempting to be "zipped" to the input data chunk 2.

If "zipping" of an input data chunk against a reference in the manifest fails, the reference in the manifest may be compared against a predetermined number of adjacent input data chunks, until a match is found. This allows zipping "ghijklmnop" against GHXJIKLMNYOP around selected input chunk M successfully (note extra input data chunks X and Y which do not have matching references), to determine that input data chunks GHJIKLMNOP have corresponding specimen data chunks 6 in chunk store 8.

Conversely, an input data chunk may be compared against a predetermined number of adjacent references, until a match is found and zipping re-established. This would allow successful zipping of ghxijklmnyzop against GHIJKLMNOP (note extra references x, y, and z).

If the zipping of the selected input data chunk 12 against the first reference to its corresponding specimen data chunk 6 in the first manifest was insufficiently successful, the data processor apparatus 3 may repeat the zipping process, this time against the second reference to that specimen data chunk 6 if any.

Additional references to that specimen data chunk 6 may be tried in turn while the zipping remains unsuccessful. If the zipping is still insufficiently successful, the data processor apparatus 3 may repeat the zipping process using the next identified manifest. If it proves unsatisfactory, the next may be tried in turn until enough success is achieved or a predetermined limit is reached.

An example of the above process may be described with reference to FIG. 6. FIG. 6(a) shows a schematic illustration of an input data set 15. FIG. 6(b) shows a schematic illustration of an identified manifest 16. In this example, how the manifest 16 was identified as not important. All that matters in this example is that input data set 15 is compared against the manifest 16.

There are two references 'b' to specimen data chunk B in manifest 16. Suppose that that a data processor first attempts to "zip" the input data set 15 against the first reference 'b' toward the left of the manifest 16. Zipping will be partially successful, but only for two adjacent references/input data chunks on each side of b. Any further attempt at zipping will be unsuccessful. After a predetermined number of failures, or indeed a predetermined number of successes, the data processing apparatus may attempt to "re-zip" against the second reference 'b'. In this case, it will be seen that the remaining input data chunks X, Y, E and F will successfully be "zipped" against the references 'x', 'y', 'e' and 'f'. Without carrying out such a process according to an embodiment, the references 'x', 'y', 'e' and 'x', 'y', 'e' may never have been found, because none have the predetermined characteristic.

Once the data processor apparatus 3 has finished with the first selected input data chunk 12, i.e. when it has hopefully found at least one reference to a specimen data chunk 6 corresponding to at least one other input data chunk—it selects a new input data chunk 12 with the predetermined characteristic if any remain and repeats the zipping procedure with it. This is repeated until no input data chunks 12 with the predetermined characteristic remained to be selected. At this point, data processor apparatus 3 has finished determining which of the input data chunks 12 in data set 11 have corresponding specimen data chunks 6 in chunk store 8. There may exist the situation where a large proportion of input data chunks have a predetermined characteristic, and already exist as specimen data chunks 6 in the chunk store 4. In such a case, there may be no need to refer to manifests. Instead, a manifest representing the new input data set may be compiled using the entries in the sparse chunk index 8 alone.

Populating the Sparse Chunk Index II

Sparse chunk indexes of a data processing apparatus not embodying the present invention may populate the sparse index with information on specimen data chunks based on the order in which they were added to the chunk store 4, or the position of a corresponding input data chunk 2 in a given input data set 1. In addition, input data chunks 2 may be chosen for comparison with the entries in the sparse index based on their position in the input data set 1. For example, every Xth input data chunk may be selected for comparison with existing sparse index entries. If an entry exists, the corresponding specimen data chunk 6 is identified and from there at least one manifest having a reference to that specimen data chunk 6 is identified for subsequent processing.

On the other hand, if there is no entry in the sparse index for a selected input data chunk, an entry will be made. Thus, for a given input data set, should there not already be an entry in the sparse chunk index 8 for a specimen data chunk corresponding to a Xth input data chunk, an entry will be made. Where a subsequent input data set is largely identical to a previous input data set, apart from a new section of data at the end, substantially the same input data chunks will be selected for comparison. As a consequence, there will be identified entries already in the sparse chunk index 8 for specimen data chunks corresponding to this selected input data chunks 2. For the new section of data at the end of the subsequent input data set 1, there may be added at least one reference to a corresponding specimen data chunk added to the sparse chunk index 8.

Suppose, however, that subsequent input data sets comprise large portions of previous input data sets, but with new input chunks at the beginning. The position-based selection criteria of input data chunks from the new input data set will likely cause a new set of input data chunks to be chosen. As a result, since the sparse chunk index 8 will not currently contain entries for those input data chunks, new entries will be made. This is despite the fact that the existing entries in the sparse chunk index 8 could have been used to identify the previous manifest. Accordingly, the sparse chunk index 8 will increase in size, without any further benefit being derived from it.

An input data set 17 is shown in FIG. 7(*a*). How the input data set 17 may be processed by a method according to an embodiment will now be described. In this example, the chunk store 4, sparse chunk index 8 and manifest store 5 are not yet populated with information.

Data processing apparatus 3 is operable to identify candidate data chunks from the input data chunks of input data set 17. The candidate data chunks are input data chunks having the predetermined characteristic. As illustrated in FIG. 7(*a*), using circles, input data chunks A, D, N and P have the predetermined characteristic.

From FIG. 7(*a*) it may be seen that input data chunks A and D are close together; as are input data chunks N and P. Subsequent input data sets to be processed may contain regions of input data chunks which are similar to regions of input data chunks of input data set 17. For example, a subsequent input data set may comprise input data chunks ABCDEF. Assuming that entries were made in a sparse chunk index 8 for both input data chunks A and D, having a predetermined characteristic, then either could be used to identify the previously compiled manifest containing the input data chunks ABCDEF. However, it will noted that to identify the manifest, a reference relating only to one of specimen data chunks A and D was needed. The reference to the other specimen data chunk was superfluous.

One embodiment of the present invention is operable not to populate the sparse chunk index 8 with information relating to all candidate data chunks having a predetermined characteristic, but only some of those candidate chunks according to selection criteria. Searches to identify manifests may continue to use all input data chunks having the predetermined characteristic.

As described previously, the predetermined characteristic, in one embodiment, is where the first M bits of a chunk identifier of an input data chunk are 0. If chunk identifiers are hashes of the given chunk's contents, the distribution of input data chunks having chunk identifiers with a predetermined characteristic in an input data set is likely to be random. As a result, some input data chunks with chunk identifiers having a predetermined characteristic may be clustered together. Conversely, some may be spaced far apart. Thus, although globally the scarcity of entries made in the sparse chunk index 8 for input data sets may be consistent, there is scope for local clustering or distribution of input data chunks having the predetermined characteristic.

In one embodiment of the present invention, the selection criteria for whether a candidate input data chunk is selected to populate the sparse chunk index 8 with information relating to a specimen data chunk 6 corresponding to that candidate data chunk are based on the position in the input data of a previously selected candidate data chunk.

In one embodiment, there must be at least a predetermined number of input data chunks in an input data set between candidate data chunks selected to populate the sparse chunk index 8. FIG. 7(*b*) illustrates an example selection 18 of the specimen data chunks having a predetermined characteristic shown in FIG. 7(*a*). The sparse chunk index 8 of data processing apparatus 3 may be populated with information relating only to those specimen data chunks shown in FIG. 7(*b*), according to selection criteria according to an embodiment.

In one embodiment, the algorithm for which candidate data chunks should be selected for population of the sparse chunk index 8 is as follows. Let:

$$h = D - 1/S$$

where:
D is the predetermined desired average distance between selected candidate data chunks in an input data set 1; and
S is the ratio of candidate data chunks to total input data chunks.

In the embodiment where a chunk has the predefined characteristic when the most significant M bits of its chunk identifier are zero, $S=1/2^m$, as described previously. Thus, $h=D-2^M$ (i.e. 'h' equals 'D' minus 2 to the power of 'M')

When processing an input data set, the data processor apparatus 3 selects candidate data chunks from left to right. In one embodiment, the leftmost candidate data chunk is always selected. Then the data processor apparatus 3 repeatedly selects the leftmost candidate data chunk that is at least h+1 input data chunks to the right of the last selected candidate data chunk. FIG. (b) shows the selections made by this algorithm with h=3. Candidate data chunks D and P are not selected because they are too close to the previously selected candidate data chunks (A and N respectively). If h had been 2, candidate data chunk D would also have been selected. The expected distance between selected candidate data chunks with this algorithm is E(<min distance>+<distance to next candidate data chunk after that>)=E(h+1/S)=D as desired. A benefit of this embodiment is that the population of the sparse chunk index 8 with information on candidate data chunks corresponding to clusters of input data chunks all having a predetermined characteristic is substantially reduced without substantially adversely affecting the level of deduplication.

The value of 'D' is a predetermined value, chosen so as to avoid information relating to candidate data chunks likely to be 'clustered' in a data set being added to a sparse chunk index 8. The value of D may be changed as data sets are processed by data processing apparatus. Many variations of this basic algorithm will be apparent to the practitioner of the art; for example, selection of candidate data chunks may be performed from right to left. The rightmost candidate data chunk may always be selected, even if it is very close to the previously selected candidate data chunk.

In another embodiment, the data processing apparatus is operable to identify candidate chunks having the predetermined characteristic, and elite candidate chunks from the candidate chunks having a second predetermined characteristic. Thus, there will be fewer elite candidate chunks than candidate chunks. Elite candidate data chunks are a subset of the candidate data chunks, thus all elite candidate data chunks will also be candidate data chunks.

When processing a data set 1, data processing apparatus 3 may populate the sparse chunk index 8 with information relating only to the elite candidate data chunks of that data set 1. However, if it is determined that at least two elite candidate data chunks are too spaced apart (local distribution) or alternatively that there are too few elite candidates for the input data set (global distribution), then the sparse index may be populated with information relating to all the candidate data chunks of that data set 1.

In one embodiment, when processing a data set 1, data processing apparatus 3 may populate the sparse chunk index 8 with information relating only to the candidate data chunks of that data set 1. However, if it is determined that at least two candidate data chunks are too close together (i.e. locally clustered) or alternatively that there are too many candidate data chunks for the input data set (globally clustered), then the sparse chunk index 8 may be populated instead with information relating to the elite candidate data chunks of that data set 1.

In one embodiment, the data processing apparatus 3 may select from non-elite candidate and elite candidate chunks according to selection criteria. In one embodiment, only the elite candidate chunks are initially selected. If it is determined that two elite candidate chunks are too far apart (local distribution), at least one non-elite candidate chunk will be selected which is in between the two elite candidate chunks, if possible. In one embodiment, non-elite candidate chunks may not be selected if they are less than a predetermined distance from the previously selected elite candidates.

If an input data set 1 comprises a run of input data chunks 2, data processing apparatus 3 is operable to select at least one input data chunk 2 having a predetermined characteristic and add information to the sparse chunk index 8 relating to the selected input data chunk 2. Should any subsequent input data set to be processed by the data processing apparatus 3 include the selected input data chunk 2, the manifest representing the previous input data set 1 will be identified. Should the subsequent input data set 1 contain an identical set of input data chunks 2, then the returned manifest will quickly enable a manifest to be compiled for the new input data set 1. For an input data set 1 of a given size (bytes or number of chunks), there may be a predetermined preferred number of sparse chunk index 8 entries for the input data set 1. Where input data chunks 2 of an input data set 1 having a predetermined characteristic are chosen for use in populating the sparse chunk index 8, the criteria for the characteristic may be chosen so that the number of input data chunks 2 of an input data set 1 having the predetermined characteristic is on average a predetermined preferred number.

A benefit of this is that an adequate number of entries are made in the sparse chunk index 8, for a given number of input data chunks. If too few entries are made, then there is the risk that duplicate copies of specimen data chunks may be made. Conversely, if too many entries are made in the sparse chunk index 8, the size of the sparse chunk index 8 will increase in size, without any corresponding increase in efficiency resulting.

In another embodiment, the data processing apparatus is operable to identify a first group of candidate chunks having a first predetermined characteristic; a second group of candidate data chunks having a second predetermined characteristic; and a third group of candidate data chunks having a third predetermined characteristic. In this embodiment, the second group may be a superset of the first group and the third group may be a superset of the second group.

For a given input data set 1, having identified the first, second, and third groups of candidate data chunks, the number of candidate chunks in each group may be computed. If the number of candidate chunks in the first group exceeds a predetermined fraction of the total size of the input data set 1 then the sparse chunk index 8 may be populated with information relating to the data chunks in the first group. Otherwise, if the total number of data chunks in the first and second groups exceeds a predetermined fraction of the total size of the input data set 1 then the sparse chunk index 8 may be populated with information relating to the candidate chunks in both the first and second groups. Otherwise, the sparse index may be populated with information relating to the candidate chunks in the first, second, and third groups.

In another embodiment, for a given input data set 1, having identified the first, second, and third groups of candidate data chunks, the number of candidate chunks in the first group; the first and second groups; and the first, second, and third groups may be computed. Whichever of these sets of groups possesses a fraction of candidate data chunks to total input data chunks closest to a predetermined fraction is noted and used to populate the sparse chunk index 8.

Should there be no groups which contain a number of specimen data chunks which fall within a predetermined range of the target size, then a number of specimen data chunks within the predetermined range may be selected from one or all of the groups. Thus, even if the total number of candidate data chunks in the first group is higher than the predetermined range, then data processing apparatus 3 may select from those candidate chunks in the first group. It will be appreciated that more or fewer than three groups may also be used.

In another embodiment, the data processing apparatus 3 first computes the positions in the input data set 1 where ideally it would like to select candidate chunks. For example, it might choose position 0 (i.e., the first input data chunk), position D, position 2*D, and so on, in an attempt to spread out as evenly as possible its selected candidates. It then selects the closest candidate data chunk to each position.

In another embodiment, when processing an input data set, the data processor apparatus 3 selects candidate data chunks from left to right. The leftmost candidate data chunk is always selected. Then the data processor apparatus 3 repeatedly selects the candidate data chunk that has not already been selected, to the right of the last selected candidate data chunk, and is closest to the position D+<position of last selected candidate data chunk>.

It will be appreciated that the selection methods described herein may be combined in many ways. For example, we could combine the algorithm using h=D−1/S with one using elite candidates. First run the h algorithm using only elite candidates and count how many elite candidates are selected. If there are enough candidates chosen, use those elite candidates. Otherwise, rerun the h algorithm using all candidates and use the resulting selected candidates, both elite and non-elite. A similar combination of the h algorithm with the first/second/third groups algorithm is also possible.

In some embodiments, the value of D may be varied depending on the position of the input data set 1 being looked at. For example, a low value of D (and hence h) may be used for the left and right ends of the input data set 1 and a higher value in between.

Figure 8:
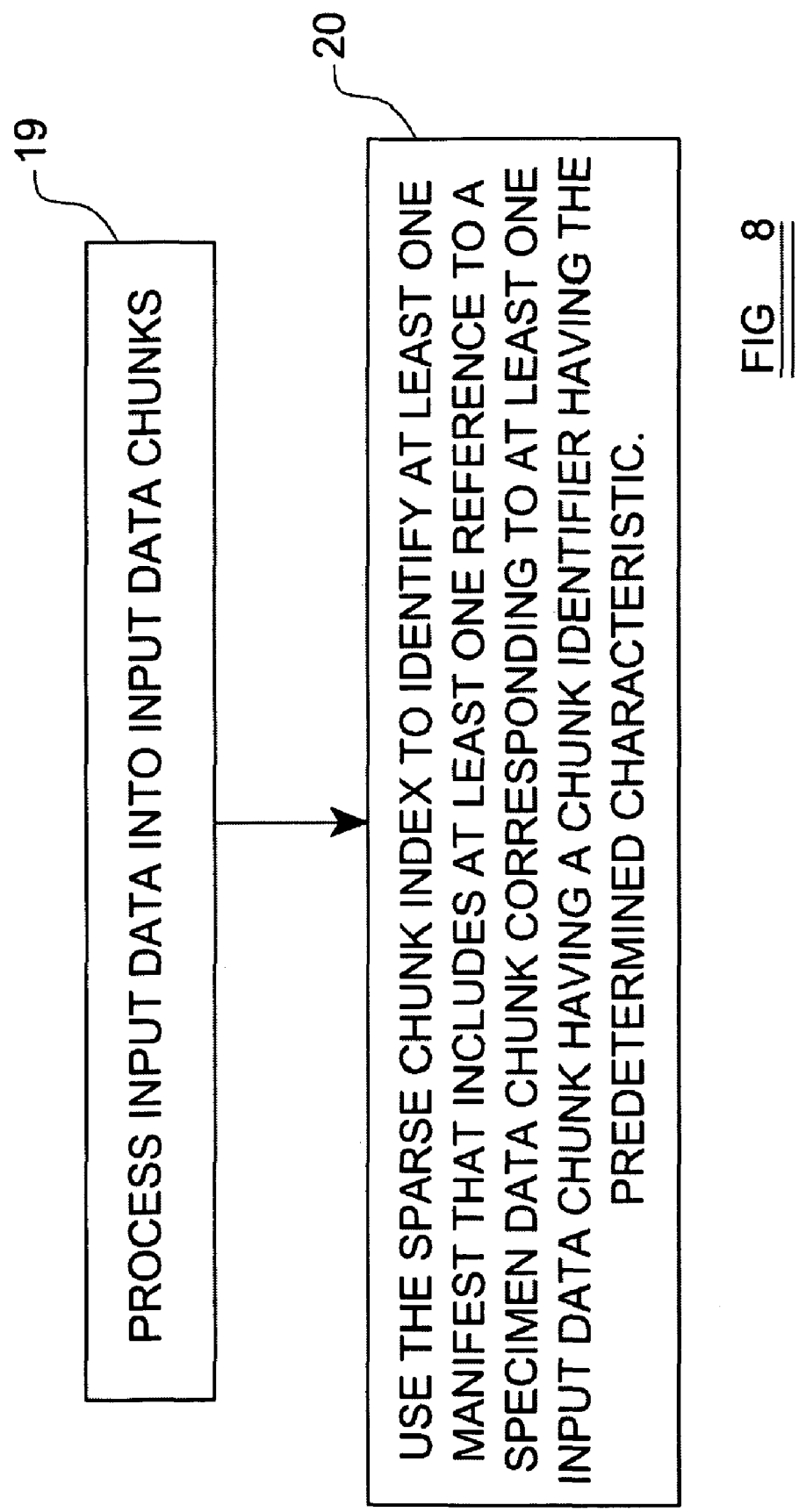
FIG. 8 shows a flow chart of a method according to an embodiment.

With reference to FIG. 8, a method of processing data according to an embodiment uses: a chunk store containing specimen data chunks, a manifest store containing at least one manifest that represents at least a part of a data set and that comprises at least one reference to at least one of said specimen data chunks, and a sparse chunk index containing information on only those specimen data chunks having a chunk identifier having a predetermined characteristic. The method comprises: processing 19 input data into input data chunks; and using 20 the sparse chunk index to identify at least one manifest that includes at least one reference to a specimen data chunk corresponding to at least one input data chunk having a chunk identifier having the predetermined characteristic.

In one embodiment, the method further comprises analysing the identified at least one manifest and identifying at least one reference to a specimen data chunk corresponding to at least one other input data chunk With reference to FIG. 9, another method of processing data according to an embodiment uses: a chunk store configured for containing specimen data chunks and a sparse chunk index configured for containing information on only some specimen data chunks. The method comprises processing 21 input data into input data chunks; generating 22 a chunk identifier for each input data chunk; identifying 23 at least one candidate data chunk from the input data chunks having a chunk identifier having a predetermined characteristic; and selecting 24 at least one candidate data chunk according to at least one selection criterion to populate the sparse chunk index with information relating to a specimen data chunk corresponding to one of the selected at least one candidate data chunk.

It should be appreciated that with embodiments of the present invention, all of the input data chunks 2 having a predetermined characteristic may be compared with the specimen data chunks for which information is contained in the sparse chunk index 8. It is only when populating the sparse chunk index 8 with information relating to an input data set 1 being processed that the selection criteria may be used.

It should further be appreciated that, with embodiments of the present invention, for a given input data set, references to specimen data chunks corresponding to input data chunks of the input data set may be found across a plurality of unconnected and unrelated manifests. For example, different parts of an input data set being processed may be identical to different parts of a plurality of previously compiled manifests. Thus, if an input data set is identical to the combination of two previously processed input data sets, apparatus and methods according to some embodiments may be operable to identify the respective manifests of those two previous input data sets and compile a new manifest using the references in the previous manifests. This may be despite the fact that, at the time of processing, the previous two input data sets had no connection with or relevance to, one another.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A data processing apparatus comprising:
a chunk store configured for containing specimen data chunks,
a manifest store configured for containing at least one manifest that represents at least a part of a data set and that comprises at least one reference to at least one of said specimen data chunks,
a sparse chunk index configured for containing information on only those specimen data chunks having a predetermined characteristic, wherein said information of said sparse chunk index refers to at least one manifest in the manifest store comprising a reference to at least one of said specimen data chunks having said predetermined characteristic,
at least one processor to:
process input data into input data chunks, and use the sparse chunk index to identify at least one of said at least one manifest that includes at least one reference to one of said specimen data chunks that corresponds to one of said input data chunks having the predetermined characteristic.

2. The data processing apparatus according to claim 1, wherein a specimen data chunk possesses said predetermined characteristic when that specimen data chunk's chunk identifier possesses said predetermined characteristic.

3. The data processing apparatus according to claim 2, wherein the chunk identifier is a hash.

4. The data processing apparatus according to claim 3, wherein a hash possesses said predetermined characteristic when at least M bits of that hash have a predetermined value.

5. The data processing apparatus according to claim 1, wherein the at least one processor is to further analyze said identified at least one manifest and identify at least one reference to one of said specimen data chunks that corresponds to at least one other input data chunk of the input data set.

6. The data processing apparatus according to claim 1, operable to store a particular input data chunk in the chunk store as a particular specimen data chunk, should it be determined that a specimen data chunk corresponding to the particular input data chunk does not exist in the chunk store.

7. The data processing apparatus according to claim 6, wherein the at least the processor is to populate the sparse chunk index with information on said particular specimen data chunk if said particular specimen data chunk has said predetermined characteristic.

8. The data processing apparatus according to claim 1, wherein said information contained in said sparse chunk index includes a chunk identifier of at least one of said specimen data chunks having said predetermined characteristic.

9. The data processing apparatus according to claim 1, wherein at least one of the at least one manifest in the manifest store further comprises a chunk identifier of each specimen data chunk referenced by that manifest.

10. The data processing apparatus according to claim 9, wherein the at least one processor is to generate and compare a chunk identifier of another input data chunk with the chunk identifiers in said manifest, and to identify at least one reference to one of said specimen data chunks that corresponds to said other input data chunk of the input data set.

11. A data processing apparatus comprising:
a chunk store configured for containing specimen data chunks,
a manifest store configured for containing at least one manifest that represents at least a part of a data set and that comprises at least one reference to at least one of said specimen data chunks,
a sparse chunk index configured for containing information on only some specimen data chunks having a predetermined characteristic,
at least one processor to:
process input data into input data chunks;
identify candidate data chunks from the input data chunks, where the candidate data chunks have the predetermined characteristic;
select less than all of candidate data chunks according to at least one selection criterion to populate the sparse chunk index with information relating to the selected candidate data chunks, where the at least one selection criterion selects a particular one of the candidate data chunks to populate the sparse chunk index based on a position of the particular candidate data chunk to another one of the candidate data chunks that has been selected to populate the sparse chunk index; and
use the sparse chunk index to identify at least one manifest that includes at least one reference to one of said specimen data chunks corresponding to an input data chunk having the predetermined characteristic.

12. A data processing apparatus comprising:
a chunk store configured for containing specimen data chunks,
a sparse chunk index, configured for containing information on only some specimen data chunks,
at least one processor to:
process input data into input data chunks;
identify at least one candidate data chunk from the input data chunks having a predetermined characteristic; and
select at least one candidate data chunk according to at least one selection criterion to populate the sparse chunk index with information relating to at least one of the specimen data chunks corresponding to the selected at least one candidate data chunk, wherein the selection criterion is that there are at least a predetermined number of input data chunks between selected candidate data chunks.

13. The data processing apparatus according to claim 12, wherein the sparse chunk index is configured for containing information on only said at least one candidate data chunk.

14. The data processing apparatus according to claim 12, wherein the at least one processor is to select a candidate data chunk, according to the at least one selection criteria, based, at least in part, on the position in the input data of a previously selected candidate data chunk.

15. A data processing apparatus comprising:
a chunk store configured for containing specimen data chunks,
a sparse chunk index, configured for containing information on only some specimen data chunks,
at least one processor to:
process input data into input data chunks;
identify at least one candidate data chunk from the input data chunks having a predetermined characteristic; and
select at least one candidate data chunk according to at least one selection criterion to populate the sparse chunk index with information relating to at least one of the specimen data chunks corresponding to the selected at least one candidate data chunk, wherein the selection criterion is that there are no more than a predetermined number of input data chunks between selected candidate data chunks.

16. A method of processing data comprising:
providing a chunk store containing specimen data chunks;
providing a manifest store containing at least one manifest that represents at least a part of a data set and that comprises at least one reference to at least one of said specimen data chunks;
providing a sparse chunk index containing information on only those specimen data chunks having a chunk identifier having a predetermined characteristic, wherein said information contained in said sparse chunk index refers to at least one manifest in the manifest store comprising a reference to at least one of said specimen data chunks having said predetermined characteristic;
processing input data into input data chunks; and
using the sparse chunk index to identify at least one manifest in the manifest store that includes at least one reference to a said specimen data chunk corresponding to at least one of said input data chunks having a chunk identifier having the predetermined characteristic.

17. The method of processing data according to claim 16, further comprising:
analyzing said identified at least one manifest and identifying at least one reference to a said specimen data chunk corresponding to at least one further input data chunk.

18. A method of processing data comprising:
providing a chunk store configured for containing specimen data chunks;
providing a sparse chunk index, configured for containing information on only some specimen data chunks;
processing input data into input data chunks;
generating a chunk identifier for each input data chunk;
identifying at least one candidate data chunk from the input data chunks having a chunk identifier having a predetermined characteristic; and
selecting at least one candidate data chunk according to at least one selection criterion to populate the sparse chunk index with information relating to a specimen data chunk corresponding to one of the selected at least one candidate data chunk, wherein the selection criterion is selected from the group consisting of: (1) a selecting criterion specifying that there are at least a first predetermined number of input data chunks between selected candidate data chunks, and (2) a selection criterion specifying that there are no more than a second predetermined number of input data chunks between selected candidate data chunks.

* * * * *